United States Patent
Higuchi

(10) Patent No.: US 6,340,201 B1
(45) Date of Patent: Jan. 22, 2002

(54) ANTI-VIBRATION SUPPORT FOR CONSTRUCTION MACHINE CAB

(75) Inventor: Takeshi Higuchi, Tsuchiura (JP)

(73) Assignee: Hitachi Construction Machinery Co., Ltd.

( * ) Notice: Subject to any disclaimer, the term of this patent is extended or adjusted under 35 U.S.C. 154(b) by 0 days.

(21) Appl. No.: 09/485,126

(22) PCT Filed: Jun. 9, 1999

(86) PCT No.: PCT/JP99/03069

§ 371 Date: Feb. 4, 2000

§ 102(e) Date: Feb. 4, 2000

(87) PCT Pub. No.: WO99/66134

PCT Pub. Date: Dec. 23, 1999

(30) Foreign Application Priority Data

Jun. 15, 1998 (JP) ............................................. 10-183369

(51) Int. Cl.[7] ............................................... B62D 33/06
(52) U.S. Cl. ............................ 296/190.07; 296/190.04; 180/89.13
(58) Field of Search ....................... 296/190.04, 190.07; 180/89.13; 267/141.1, 294

(56) References Cited

U.S. PATENT DOCUMENTS

| | | | | |
|---|---|---|---|---|
| 3,940,177 A | * | 2/1976 | Miers et al. | 296/190.03 |
| 4,135,757 A | * | 1/1979 | Smith et al. | 296/190.07 |
| 4,193,629 A | * | 3/1980 | Merkle | 296/190.07 |
| 4,235,470 A | * | 11/1980 | Kauss et al. | 296/190.07 |
| 4,438,970 A | * | 3/1984 | Boucher | 296/190.07 |
| 4,451,079 A | * | 5/1984 | Takahashi | 296/190.07 |
| 4,515,234 A | * | 5/1985 | Loy et al. | 296/190.07 |
| 4,995,598 A | * | 2/1991 | Ingham | 267/141.1 |
| 5,018,701 A | * | 5/1991 | Aki et al. | 248/631 |
| 5,240,221 A | * | 8/1993 | Thomasen | 248/559 |
| 5,242,147 A | * | 9/1993 | Kemeny | 267/141.1 |
| 5,368,119 A | * | 11/1994 | Nystrom | 180/89.13 |
| 5,373,670 A | * | 12/1994 | Sasaki et al. | 267/141.1 |
| 5,465,945 A | * | 11/1995 | Matsushita et al. | 267/294 |
| 5,553,911 A | * | 9/1996 | Bodin et al. | 180/89.13 |
| 5,676,356 A | * | 10/1997 | Ekonen et al. | 267/294 |
| 5,738,330 A | * | 4/1998 | Folkens et al. | 267/294 |
| 5,833,038 A | * | 11/1998 | Sheiba | 267/141.1 |
| 5,984,036 A | * | 11/1999 | Higuchi et al. | 296/190.07 |
| 6,017,073 A | * | 1/2000 | Lindblom et al. | 296/190.07 |
| 6,105,699 A | * | 8/2000 | Hinds | 180/89.13 |

FOREIGN PATENT DOCUMENTS

| | | | | |
|---|---|---|---|---|
| JP | 58-80467 | 5/1983 | | |
| JP | 403287405 A | * 12/1991 | | 267/141.1 |
| JP | 5-125745 | 5/1993 | | |
| JP | 6-42012 | 2/1994 | | |

* cited by examiner

*Primary Examiner*—Stephen T. Gordon
*Assistant Examiner*—Hilary Gutman
(74) *Attorney, Agent, or Firm*—Mattingly, Stanger & Malur, P.C.

(57) ABSTRACT

A construction machine adapted to suppress transmission of vibrations from a main frame to a cab. The cab is supported on a bed frame by anti-vibrational mounts, each provided with a laminated rubber body having relatively high rigidity against vibrations in vertical directions and relatively small rigidity against vibrations in horizontal directions. A floor panel of the cab is connected to the bed frame by horizontally mounted oil dampers constituting vibration attenuators. Consequently, when the bed frame is vibrated, the cab undergoes horizontal parallel movements due to flexure of the laminated rubber bodies, thereby preventing occurrences of pitching, rolling and yawing vibrations. Even if residual vibrations occur on the cab due to the resilient restoring force of the laminated rubber bodies, such residual vibrations can be attenuated by the oil dampers, thereby preventing the phenomenon of resonance which might otherwise result from the residual vibrations and to improve the amenity within the cab.

11 Claims, 17 Drawing Sheets

ANTI-VIBRATION SUPPORT FOR CONSTRUCTION MACHINE CAB

TECHNICAL FIELD

This invention relates generally to a construction machine with an operator's cab, for example, a hydraulic excavator, a hydraulic crane and the like, and more particularly to a construction machine which has an operator's cab supported on a frame of the machine in a vibration damped state.

BACKGROUND ART

Generally, a hydraulic excavator as a construction machine with an operator's cab is largely constituted by a truck body, a rotary upper body which is rotatably mounted on the truck body, and a working mechanism which is provided on the upper rotary body for upward and downward lifting movements. Provided on a frame of the upper rotary body is an operator's cab which accommodates control instruments and devices to be manipulated by an operator in controlling operations of the truck body and working mechanism, and an operator's seat to be occupied by an operator.

In connection with hydraulic excavators as mentioned above, for instance, Japanese Laid-Open Patent Publication No. H5-125745 discloses a hydraulic excavator having an operator's cab mounted on a support frame in a vibration damped state, by the use of anti-vibrational mounts in the form of liquid-sealed rubber mounts which are interposed in four corner portions between the support frame and the operator's cab in an attempt to suppress transmission of vibrations from the frame to the cab during a ground excavating operation or when the machine is in travel.

In the case of the prior art hydraulic excavator with the arrangements just mentioned, vibrations which occur to the support frame during a traveling or excavating operation, are absorbed by vertical flexures of the anti-vibrational mounts to prevent direct transmission of the vibrations to the operator's cab. This contributes to improve the amenity of the operator's cab as well as the maneuverability of various control levers and the like.

Among hydraulic excavators of various classes, the large-size hydraulic excavators which are used, for example, in excavating a large quantity of earth at open mining sites, are usually constructed in a different concept. Namely, in the construction of large-size hydraulic excavators, there has been a trend toward giving top priority to the machine durability rather than the amenity of the operator's cab because, in the case of machine trouble, repair work could take an enormously long time. For this reason, usually little attention is paid to the amenity of the operator's cab in the construction of large-size hydraulic excavators.

Especially in the case of a hydraulic excavator of the so-called high mount cab type, a vertical or upright bed frame is provided on a main frame which constitutes a bottom portion of a rotary body, and an operator's cab is mounted on top of the bed frame. In a high mount cab type hydraulic excavator, due to the provision of the bed frame, the operator's cab is located in a position which is largely spaced away from a truck body in an upward direction, and vibrations which occur when the machine is in travel or which occur during an excavating operation are transmitted to the cab through the bed frame, thereby putting the cab in conspicuous vibrational movements.

In this regard, even for large-size hydraulic excavators, it is conceivable to employ the above-mentioned anti-vibrational mounts between a bed frame and a cab structure to suppress transmission of vibrations from the bed frame to the cab and to improve the amenity of the cab in a similar manner.

However, large-size hydraulic excavators which are often used for a horizontal excavating operation by a loader bucket, have an inherent problem that vibrations in back and forth directions as well as vibrations in lateral directions (both vibrations hereinafter referred to collectively as "horizontal vibrations" for brevity) are more likely to be transmitted to the cab during excavating operations. Nonetheless, the prior art anti-vibrational mounts which are designed to absorb mainly vertical vibrations, are arranged to have relatively low rigidity against vertical vibrations and relatively high rigidity against horizontal vibrations.

Therefore, in the case of high mount cab type hydraulic excavators, the conventional anti-vibrational mounts which have high rigidity against horizontal vibrations, are incapable of absorbing horizontal vibrations which occur to a bed frame at the time of ground excavating operations. Accordingly, as shown in FIG. 17, if a bed frame 101 is put in vibrations in a back and forth direction (in the direction of arrow a), a cab 102 is largely shaken on the bed frame 101 by pitching (back and forth vibrations) as indicated by arrow b to deteriorate the amenity of the cab as well as the maneuverability of control levers or other devices to a considerable degree. On the other hand, if the bed frame is put in vibrations in a lateral direction, the cab 102 is also largely shaken by rolling (rightward and leftward vibrations). A further problem is that, when the rotary body is put in a rotational movement, the cab 102 is shaken by yawing (vibrations in a rotational direction).

DISCLOSURE OF THE INVENTION

In view of the problems with the prior art as mentioned above, it is an object of the present invention to provide a construction machine with an operator's cab on a frame, which is arranged to suppress transmission of vibrations from the frame to the cab.

In accordance with the present invention, the above-mentioned problems are solved by the provision of a cab support which is applicable to a construction machine with an operator's cab, basically including a support frame, an operator's cab mounted on the support frame and internally defining an operating room, and four anti-vibrational mounts interposed in four corner portions between the support frame and the cab and adapted to support the cab in such a manner as to suppress transmission of vibrations from the frame to the cab.

More particularly, according to the present invention, there is provided a construction machine with an operator's cab, which is characterized by the provision of: four anti-vibrational mounts each constituted by a laminated rubber body having relatively high rigidity against vibration in a vertical direction and relatively low rigidity against vibration in a horizontal direction; and four vibration attenuating devices located in four corner portions between the frame and cab and in cooperative positions relative to the anti-vibrational mounts to attenuate horizontal vibrations transmitted to the cab.

With the arrangements just described, when the frame is put in vibration in a lateral direction, the laminated rubber bodies of the respective anti-vibrational mounts are caused to flex largely in a horizontal direction, thereby suppressing transmission of vibration from the frame to the cab. At this time, even if the vibration of the frame is transmitted, the cab is simply put in horizontal parallel movements and prevented from being shaken largely by pitching or rolling vibrations because the laminated rubber bodies of the anti-vibrational mounts have high rigidity against vibrations in vertical directions. Besides, even if horizontal residual vibrations occur to the cab due to resilient restoring forces of the laminated rubber bodies which are flexed by vibrations of the frame, such residual vibrations can be damped by the respective vibration attenuating devices.

In this instance, according to the present invention, two of the vibration attenuating devices, which are located in front portions of the cab, are mounted in a horizontal plane and in an angular posture such that respective longitudinal axes are intersected with each other on the front side of the cab, while the remaining two vibration attenuating devices, which are located in rear portions of the cab, are likewise mounted in a horizontal plane and in an angular posture such that respective longitudinal axis are intersected with each other on the rear side of the cab.

Further, each one of the vibration attenuating devices according to the present invention is so arranged as to have a longitudinal axis thereof located in a circumscribing position relative to an imaginary ellipse drawn around a bottom center portion of the cab.

With the arrangements just described, the respective vibration attenuating devices are mounted in a horizontal plane and in an angular posture which is inclined relative to back and forth and transverse directions of the cab. Therefore, when the cab is put in vibrations in back and forth directions or in lateral directions, these vibrations can be effectively damped by the vibrations attenuating devices. Further, the vibration attenuating devices also function to effectively suppress yawing movements which may occur to the cab as a result of a rotational movement.

Further, in one particular form of the present invention, the frame is a main frame constituting a bottom portion of a rotary body of the machine, and the cab is supported on the main frame through the anti-vibrational mounts.

In this instance, when the frame is vibrated during a vehicular traveling operation or a ground excavating operation of the machine, transmission of the vibration of the frame to the cab can be suppressed by the respective anti-vibrational mounts.

Further, in another form of the present invention, the frame is composed of a main frame constituting a bottom portion of a rotary body of the machine and a bed frame standing vertically on the main frame, and the cab is supported on the bed frame through the anti-vibrational mounts.

In this instance, the respective anti-vibrational mounts function to suppress transmission of vibrations from the frame to the cab through the bed frame, thereby preventing the cab from being largely shaken on the bed frame.

Furthermore, in a preferred form of the present invention, each one of the anti-vibrational mounts is constituted by a laminated rubber body having a number of rubber layers laminated alternately and in parallel relation with a number of thin steel sheet layers, an upper mounting plate securely fixed to an upper end of the laminated rubber body, and a lower mounting plate securely fixed to lower end of the laminated rubber body.

In this instance, preferably the frame and the lower mounting plate of each anti-vibrational mounts are securely fastened to each other by the use of bolts, and stud bolts are fixedly provided either on the side of the cab or on the side of the upper mounting plate of the anti-vibrational mounts and adapted to be received in bolt holes provided either on the side of the upper mounting plate or on the side of the cab.

With the arrangements just described, at the time of mounting the cab on the frame through the anti-vibrational mounts, the cab can be automatically set in position relative to the anti-vibrational mounts simply by fastening the lower mounting plates of the anti-vibrational mounts securely to the frame by means of bolts and inserting the stud bolts, which are provided either on the side of the upper mounting plates of the anti-vibrational mounts or on the side of the cab, into bolt holes which are provided opposingly either on the side of the cab or on the side of the upper mounting plates of the anti-vibrational mounts.

Further, in another preferred form of the present invention, the cab and the upper mounting plate of each anti-vibrational mounts are securely fastened to each other by the use of bolts, and stud bolts are fixedly provided either on the side of the frame or on the side of the lower mounting plate of the anti-vibrational mounts and adapted to be received in bolt holes provided either on the side of the lower mounting plate or on the side of the frame.

With the arrangements just described, at the time of mounting the cab on the frame through the anti-vibrational mounts, each one of the anti-vibrational mounts can be automatically set in position relative to the frame, upon inserting the stud bolts, which are provided either on the side of the lower mounting plates of the anti-vibrational mounts or on the side of the frame, into bolt holes which are provided opposingly either on the side of the frame or on the side of the lower mounting plates of the anti-vibrational mounts.

In another preferred form of the present invention, stud bolts are fixedly provided in the lower mounting plate of each anti-vibrational mounts and adapted to be received in bolt holes provided in the frame, and stud bolts are fixedly provided in the upper mounting plate of the anti-vibrational mounts and adapted to be received in bolt holes provided on the part of the cab.

With the arrangements just described, at the time of mounting the cab on the frame through the anti-vibrational mounts, the respective ones of the anti-vibrational mounts can be automatically set in position relative to the frame and the cab, upon inserting stud bolts, which are provided on the lower and upper mounting plates of the anti-vibrational mounts, into bolt holes which are provided opposingly on the side of the frame and the cab, respectively.

In still another preferred form of the present invention, the frame and the lower mounting plate of each anti-vibrational mount are securely fastened to each other by the use of bolts, and an intermediate connecting plate is attached to the upper mounting plate of the anti-vibrational mount, the intermediate connecting plate having stud bolts adapted to be received in bolt holes provided on the part of the cab.

With the arrangements just described, at the time of mounting the cab on the frame through the anti-vibrational mounts, each of the anti-vibrational mounts which have the respective lower mounting plates fastened to the frame by means of bolts, can be automatically set in position relative to the cab upon inserting the stud bolts on the intermediate connecting plate, which is attached to the upper mounting plate of each anti-vibrational mount, into bolt holes which are provided opposingly on the side of the cab. Besides, in this case, at the time of replacement of an anti-vibrational mount, it can be easily extracted in a horizontal direction as soon as the upper mounting plate is removed from the intermediate connecting plate, without being obstructed by the stud bolts.

Furthermore, in another preferred form of the present invention, the cab and the upper mounting plate of each of the anti-vibrational mounts are securely fastened to each other by the use of bolts, and an intermediate connecting plate is attached to the lower mounting plate of the anti-vibrational mount, the intermediate connecting plate having stud bolts adapted to be received in bolt holes provided on the side of the frame.

With the arrangements just described, at the time of mounting the cab on the frame through the anti-vibrational mounts, the anti-vibrational mounts can be automatically set in position relative to the frame, upon inserting the stud bolts of the intermediate connecting plate, which is attached to the lower mounting plate of each anti-vibrational mounts, into bolt holes which are provided opposingly on the side of the frame. Besides, in this case, at the time of replacement of an anti-vibrational mount, it can be easily extracted in a horizontal direction after detaching the lower mounting plate from the intermediate connecting plate, without being obstructed by the stud bolts.

BEST MODE FOR CARRYING OUT THE INVENTION

Figure 1:
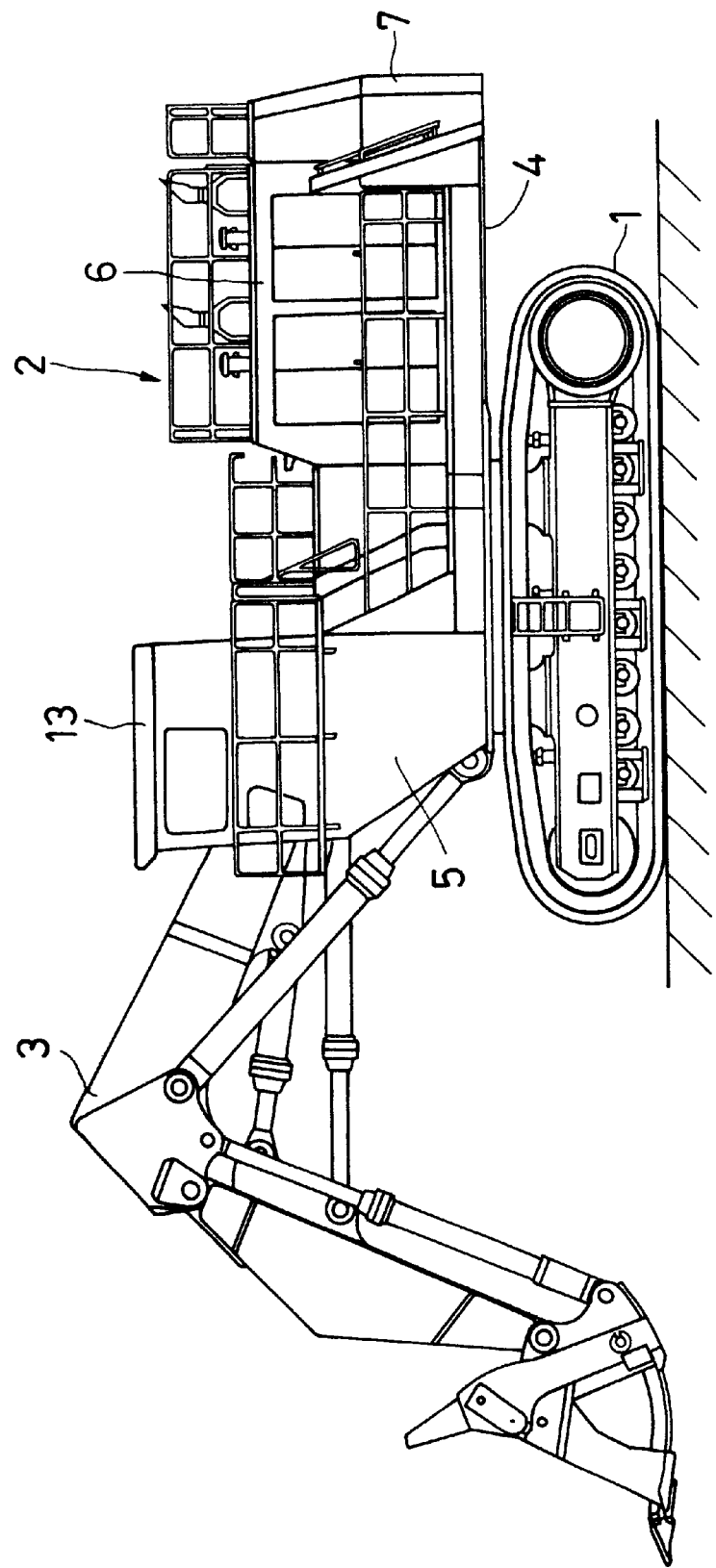
FIG. 1 is a side view of a high mount cab type hydraulic excavator applying a first embodiment of the present invention.

Hereafter, with reference to FIGS. 1 through 16 of the accompanying drawings, the present invention is described more particularly as preferred embodiments wherein the present invention is applied by way of example to a large-size hydraulic excavator which is generally referred to as "a high mount cab type hydraulic excavator".

Referring first to FIGS. 1 to 7, there is shown a first embodiment of the present invention. In these figures, indicated at 1 is a crawler type truck body and at 2 is a rotary body which is rotatably mounted on the truck body 1. Provided on a front center portion of the rotary body 2 is a loader bucket type working mechanism 3 for upward and downward lifting movements.

Denoted at 4 is a main frame which constitutes a bottom portion of the rotary body 2. This main frame 4 has a frame structure which extends in a horizontal direction, and a vertically standing bed frame 5 is set on a front left portion of the main frame. The rotary body 2 is largely constituted by the above-mentioned main frame 4 and bed frame 5, along with an operator's cab 13 which is located on the bed frame 5 as will be described hereinafter, a housing 6 which is located on a rear portion of the bed frame 5 to accommodate a prime mover (not shown) etc., and a counterweight 7 attached to a rear portion of the main frame 4 at a position behind the housing 6.

Figure 2:
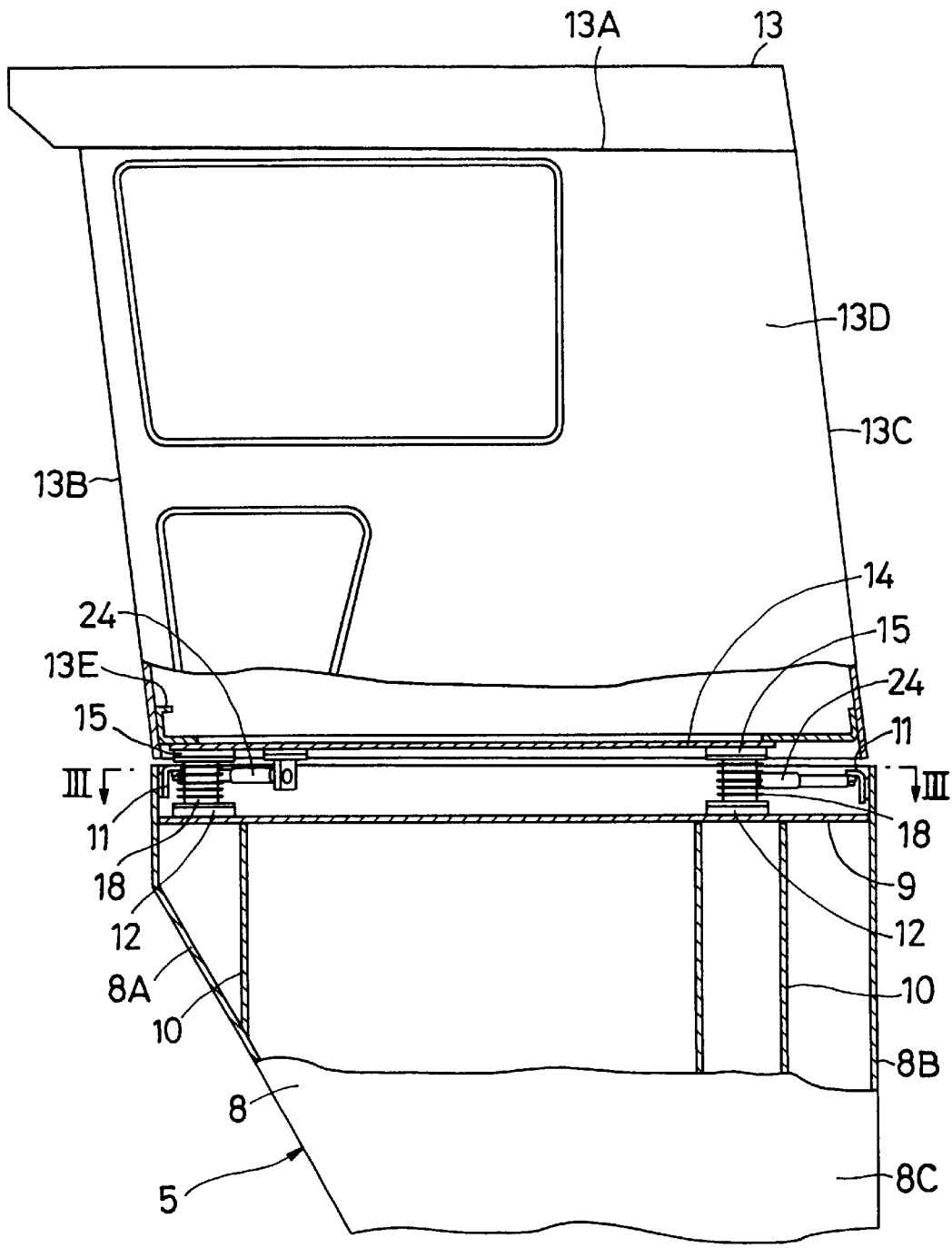
FIG. 2 is a partly cutaway side view showing on an enlarged scale a bed frame, cab, anti-vibrational mounts and oil dampers employed in the first embodiment according to the invention.
Figure 3:
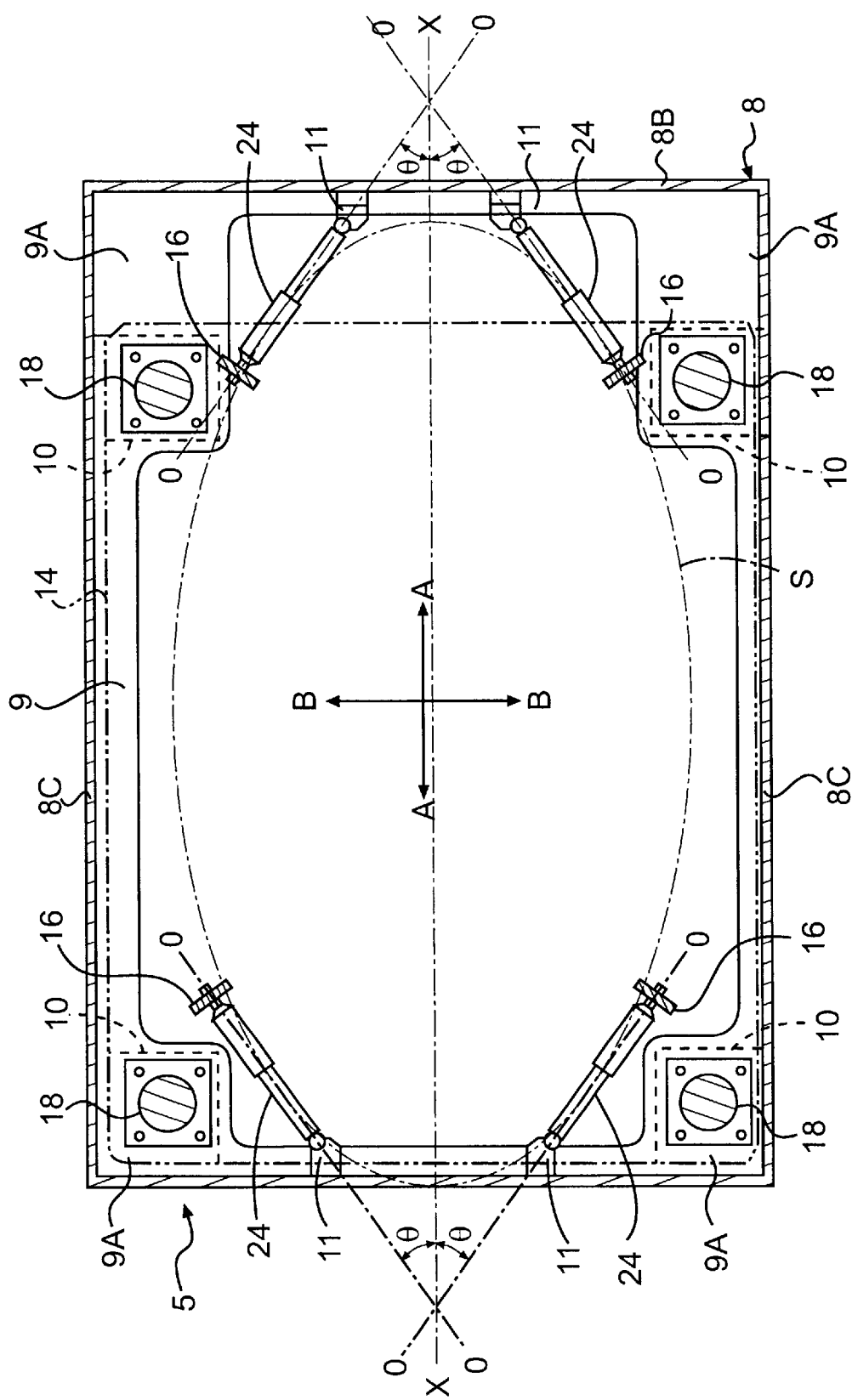
FIG. 3 is a transverse sectional view of the cab anti-vibrational mounts and oil dampers, taken from the direction of arrows III—III of FIG. 2.
Figure 4:
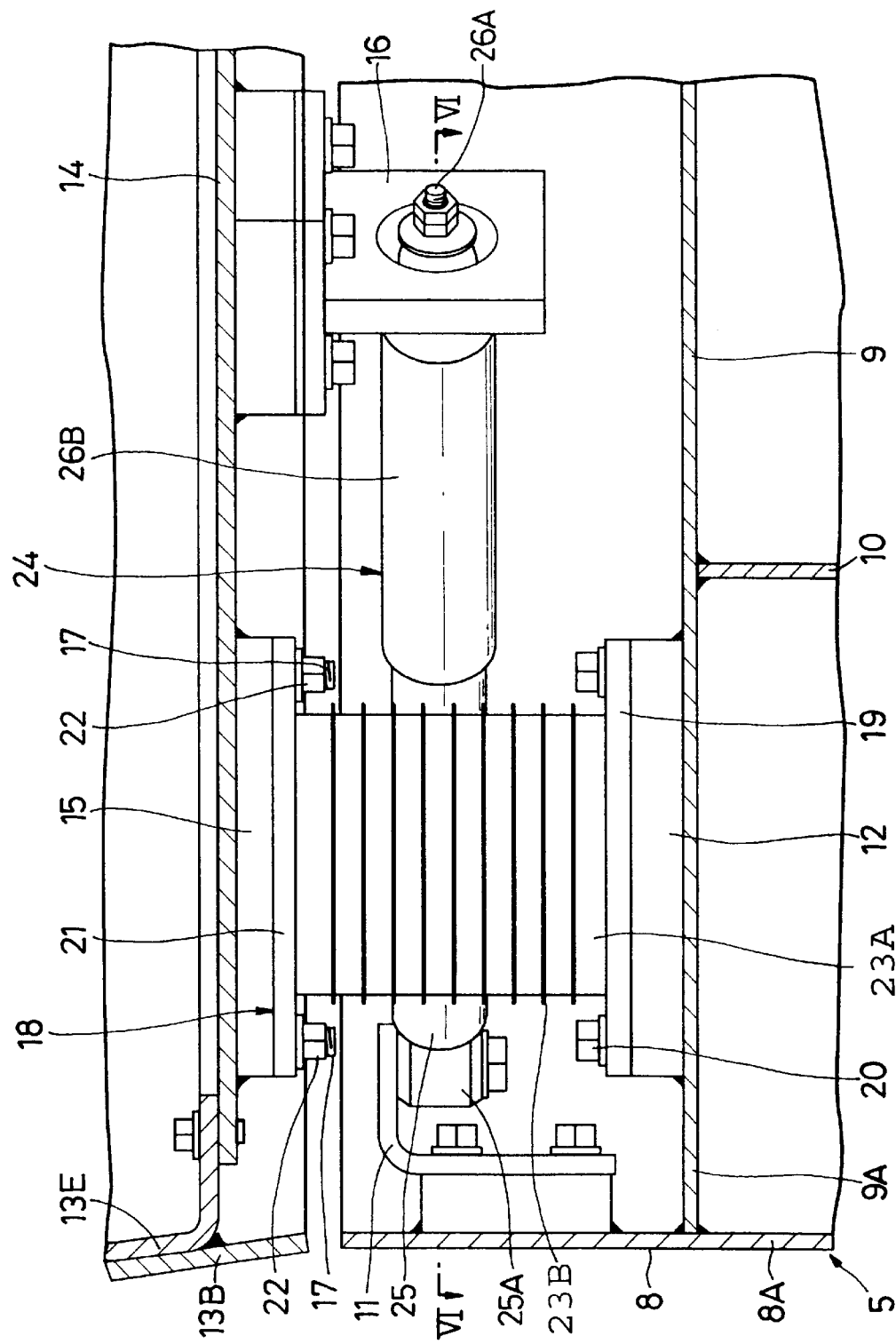
FIG. 4 is an schematic enlarged view of the cab, anti-vibrational mounts and oil damper shown in FIG. 2.

In this instance, as shown in FIGS. 2 to 4, the bed frame 5 is constituted by: a box-like outer frame 8 which is enclosed by front plate 8A, rear plate 8B and right and left side plates 8C and is open on the top side thereof; a cab support plate 9 in the form of a horizontally extended rectangular frame structure which is located in an inner upper portion of the outer frame 8 and provided with mount member fixing portions 9A in its four corner portions to support the cab 13 through anti-vibrational mounts 18 which will be described hereinafter; and vertically extending reinforcing members 10 which are attached to the lower side of the mount member fixing portions 9A for the purpose of reinforcing the cab support plate 9. By this arrangement, with high rigidity, the bed frame 5 is erected on the main frame 4.

Further, for attaching oil dampers 24 which will be described hereinafter, four brackets 11 are securely fixed to the front and rear plates 8A and 8B of the outer frame 8 by welding or other suitable means, symmetrically in the back and forth and transverse directions of the machine. Mounting seats 12 for supporting lower ends of the anti-vibrational mounts 18 are securely welded or fixed to top surfaces of the mount member fixing portions 9A of the cab support plate 9.

Indicated at 13 is a cab which is located on the bed frame 5 to define an operating room for the operator. The cab 13 is in the form of a box-like enclosure having a top side section 13A, a front side section 13B, a rear side section 13C and left and right side sections 13D (only one of which is shown in the drawings) and formed, for example, by welding together thin press-formed steel plates. Further, brackets 13E for a flooring plate are securely fixed by welding to inner lower portions of the cab 13, and a floor panel 14 is fixedly bolted to the brackets 13E to form a bottom of the cab 13. An operator's seat is provided internally of the cab 13 along with control levers and instruments (both not shown) for operating the working mechanism 3.

In this instance, at positions opposing the mounting seats 12 on the part of the bed frame 5, four mounting seats 15 are securely welded to the lower side of the floor panel 14 for the purpose of supporting upper ends of the anti-vibrational mounts 18. In addition, in order to mount the oil dampers 24, four brackets 16 on the side of the cab are securely fixed to the lower side of the floor panel 14 by welding or by other suitable means symmetrically in back and forth and transverse directions of the machine.

Figure 5:
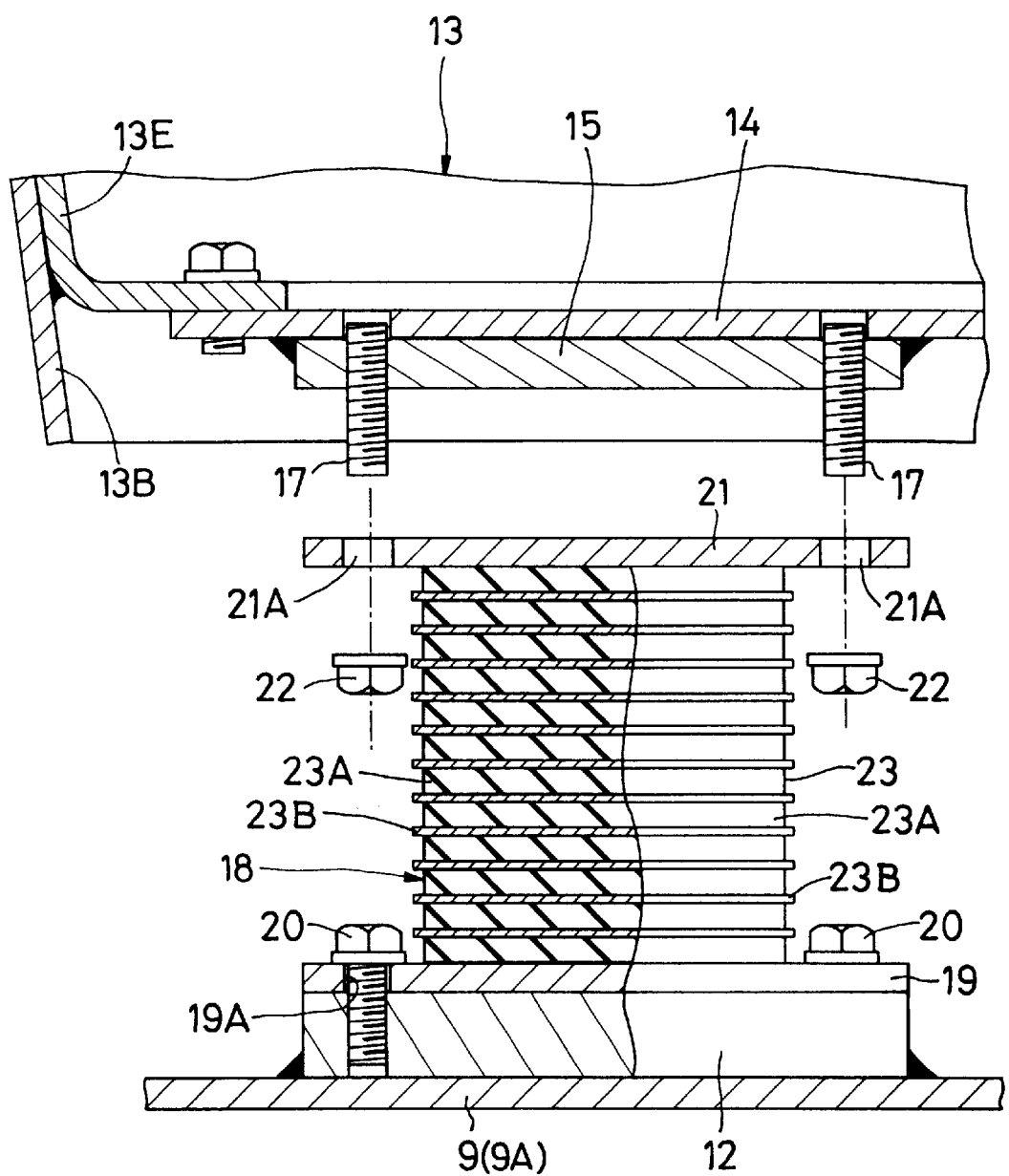
FIG. 5 is a sectional view on an enlarged scale of the cab, anti-vibrational mounts and stud bolts which are still in an unassembled state.

Indicated at 17 are four stud bolts (only two stud bolts are shown in the drawing) which are projected downward through the mounting seats 15 on the side of the cab 13. As shown in FIG. 5, these stud bolts 17 are passed through bolt passage holes 21A which are bored in upper mounting plates 21 of the anti-vibrational mounts 18 as will be described hereinbelow.

Denoted at 18 are the anti-vibrational mounts which are located at positions in four corner portions and between the floor panel 14 of the cab 13 and the bed frame 5. These anti-vibrational mounts 18 are each constituted by a lower mounting plate 19, an upper mounting plate and laminated rubber body 23, which will be described hereinafter.

The lower mounting plate 19 is attached to a mounting seat 12 on the side of the bed frame 5, and constituted by a rectangular steel plate with bolt passage holes 19A bored in four corner portions thereof. Further, the lower mounting plate 19 is fastened to the mounting seat 12 by a bolt 20 which is passed through the bolt passage hole 19A.

The upper mounting plate 21 is attached to a mounting seat 15 on the side of the cab 13, and similarly constituted by a rectangular steel plate with bolt passage holes 21A bored in four corner portions thereof. Further, the upper mounting plate 21 is fastened to a mounting seat 15 by threading and tightening a nut 22 onto a stud bolt 17 which is projected from the mounting seat 15 on the part of the cab 13 and passed through the bolt passage hole 21A.

The laminated rubber body 23 which is interposed between the upper and lower mounting plates 21 and 19, is constituted by a number of laminated resilient rubber layers 23A, and thin steel sheet layers 23B which are interposed alternately and parallel with the resilient rubber layers 23A. The top and bottom sides of the laminated rubber body 23 are securely fixed to the upper and lower mounting plates 21 and 19 by welding or by the use of an adhesive, respectively.

In this instance, the laminated rubber body 23, which is formed by laminating a number of rubber layers 23A alternately with a number of steel sheet layers 23B, has relatively high rigidity against vibrations of vertical directions, because the thin steel sheet layers 23B act to prevent flexure of the rubber layers 23A when a load is applied thereon from or in a vertical direction. On the other hand, the laminated rubber body 23 has relatively low rigidity against vibrations of an horizontal directions, because the resilient rubber layers 23A between the thin steel sheet layers 23B are allowed to flex to a relatively large degree when a load is applied thereto from or in a horizontal direction, for example, from a lateral, front or rear side of the laminated rubber body 23.

Accordingly, each one of the anti-vibrational mounts 18 with the laminated rubber body 23, functions to suppress vibrational movements of the cab 13 particularly in the back and forth direction (hereinafter referred to as "pitching" for brevity), in the lateral direction (hereinafter referred to as "rolling" for brevity) and in the vertical direction (hereinafter referred to as "bouncing" for brevity), thereby supporting the cab 13 in a quite stabilized state. Even if vibration is transmitted to the cab 13, the laminated rubber bodies 23 which have relatively high rigidity in the vertical direction function to translate the vibration of the cab 13 into horizontal parallel movements and prevent pitching and rolling movements of the cab 13.

Figure 6:
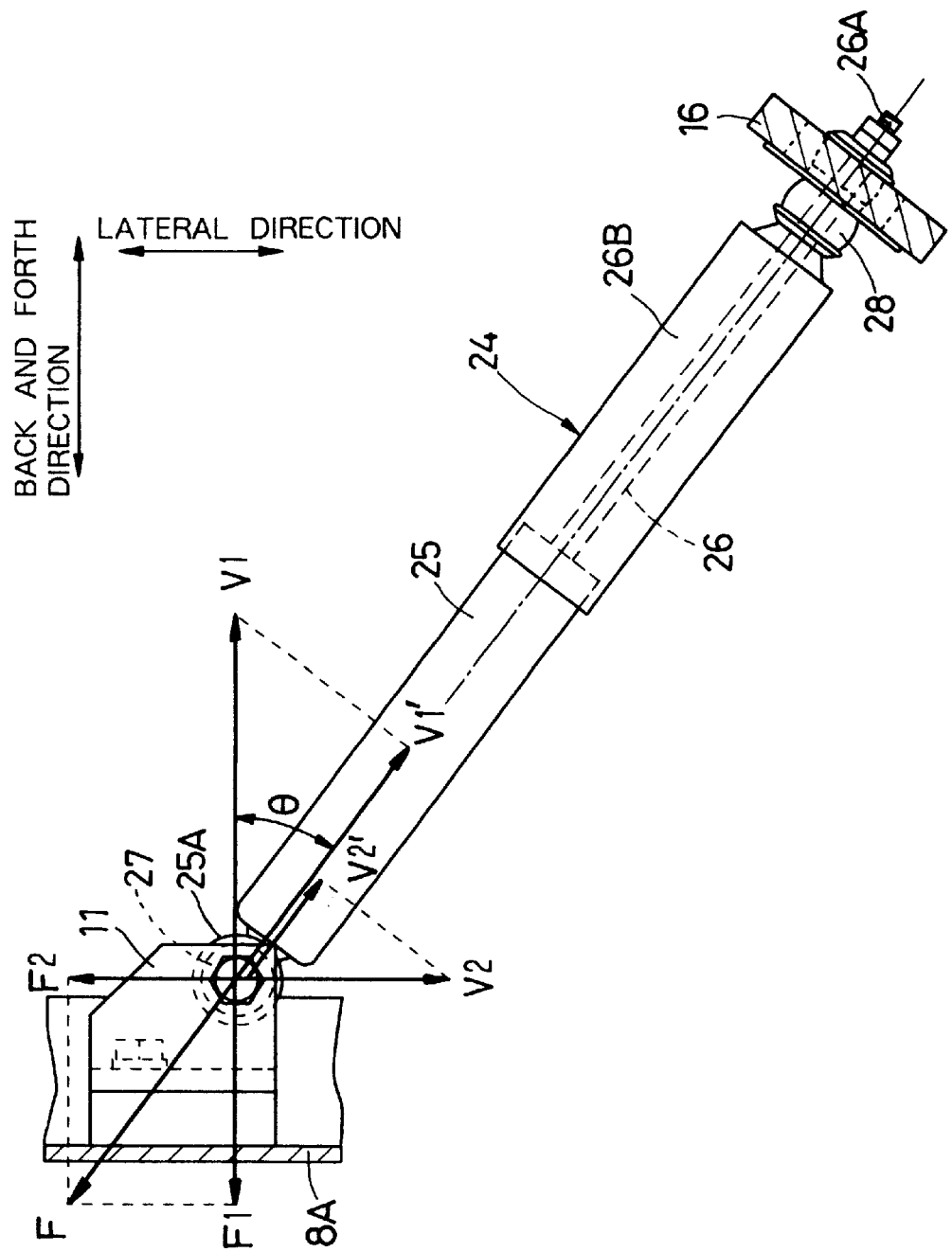
FIG. 6 is a transverse sectional view taken from the direction of arrows VI—VI of FIG. 4, showing the relationship of a force acting on an oil damper with its telescopic stretching and contracting velocities.

Denoted at 24 are four oil dampers which function as vibration attenuators for the cab 13. These oil dampers 24 are located horizontally in four corner portions between the cab 13 and the floor panel 14 and in corresponding positions relative to the anti-vibrational mounts 18. In this instance, as shown in FIGS. 4 and 6, each one of the oil dampers 24 is composed of a tube 25 having a piston (not shown) slidably fitted therein, and a piston rod 26 which is connected at its base or inner end to the piston within the tube 25 and projected out of the tube 25 at the other outer end. Attenuating force is produced by each oil damper 24 as the piston is reciprocated within the tube 25 against resistance of oil. Further, a mounting eye 25A is securely fixed to the base end of the tube 25 of each oil damper, and a mounting bolt 26A is securely fixed to the fore projected end of the piston rod 26. The piston rod 26 is covered with a dust cover 26B.

By way of the mounting eye 25A at the base end of the tube 25, each oil damper 24 is secured resiliently through a rubber bush 27 to a bracket 11 on the side of the frame, which is securely fixed to the outer frame 8 of the bed frame 5. The mounting bolt 26A at: the fore end of the piston rod 26 is secured resiliently through a cushioning rubber member 28 to a bracket 16 on the side of the cab 13, which is securely fixed to the lower side of the floor panel 14. Consequently, the oil dampers 24 are arranged to connect the bed frame 5 and the floor panel 14 of the cab 13 with each other.

In this connection, as shown particularly in FIG. 3, the longitudinal axes O—O of the oil dampers 24 which are located in a left front portion and in a right front portion of the floor panel 14 are intersected with each other on the front side of the floor panel 14 and with an inclination angle θ relative to back and forth direction, X—X of the floor panel 14. On the other hand, the longitudinal axis O—O of the oil dampers 24 which are located in a left rear portion and in a right rear portion of the floor panel 14 are intersected with each other on the rear side of the floor panel and with an inclination angle θ relative to the back and forth direction of the floor panel 14.

Namely, the respective oil dampers 24 are mounted in an inclined angular posture or position such that the longitudinal axes O—O of the oil dampers 24 circumscribe an imaginary ellipse S (indicated by two-dot chain line in FIG. 3) which is drawn on a horizontal plane at and around a center portion of the floor panel 14.

In this instance, the inclination angle θ of each oil damper 24 is determined on the basis of a ratio of attenuation force A, which is necessary for attenuation of vibration of the cab 13 in back and forth directions, to attenuation force B which is necessary for attenuation of vibration in lateral directions.

A method of computing the inclination angle θ of the oil dampers 24 is described below with reference to FIG. 6.

Firstly, given that V1 is the velocity of movement of the cab 13 when in vibration in a back and forth direction, the velocity V1' of telescopic movement of the oil damper 24 is expressed by following Equation 1.

$$V1'=V1 \cos \theta \quad \text{[Equation 1]}$$

Nextly, given that V2 is the velocity of movement of the cab 13 when in vibration in a lateral direction, the velocity V2' of telescopic movement of the oil damper 24 is expressed by following Equation 2.

$$V2'=V2 \sin \theta \quad \text{[Equation 2]}$$

Thus, if the attenuation coefficient of the oil damper 24 is C, the attenuation force F in the axial direction of the oil damper 24 is expressed by following Equation 3.

$$F=C(V1'+V2')=C(V1 \cos \theta + V2 \sin \theta) \quad \text{[Equation 3]}$$

Further, a component F1 in a back and forth direction of the attenuation force F is expressed by following Equation 4.

$$F1=F \cos \theta \quad \text{[Equation 4]}$$

Similarly, a component F2 in a lateral direction of the attenuation force F is expressed by following Equation 5.

$$F2=F \sin \theta \quad \text{[Equation 5]}$$

Thus, a component C1 in a back and forth direction of the attenuation coefficient C is expressed by following Equation 6.

$$C1=F1/V1=F \cos \theta / V1 = C \cos \theta (V1 \cos \theta + V2 \sin \theta)/V1 \quad \text{[Equation 6]}$$

On the other hand, a component C2 in a lateral direction of the attenuation coefficient C is expressed by following Equation 7.

$$C2=F2/V2=F \sin \theta / V2 = C \sin \theta (V1 \cos \theta + V2 \sin \theta)/V2 \quad \text{[Equation 7]}$$

In this instance, of the four oil dampers 24, one of the two oil dampers which form one pair in a lateral or transverse direction has an inclination angle θ of a positive value in a horizontal plane while the other oil damper 24 has an inclination angle θ of a negative value. Accordingly, a total attenuation coefficient C1t in the back and forth direction, which is a sum of attenuation coefficients C1 of the four oil dampers in the back and forth direction, is expressed by following Equation 8.

$$C1t = \frac{2C\cos\theta(V1\cos\theta + V2\sin\theta)}{V1} + \frac{2C\cos(-\theta)\{V1\cos(-\theta) + V2\sin(-\theta)\}}{V1}$$
$$= 4C\cos^2\theta \quad \text{[Equation 8]}$$

Similarly, a total attenuation coefficient C2t in a lateral direction, which is a sum of attenuation coefficients C2 of the four oil dampers in the lateral direction, is expressed by following Equation 9.

$$C2t=4C \sin^2\theta \quad \text{[Equation 9]}$$

In this case, a ratio of attenuation force A which is necessary for attenuation of vibration of the cab 13 in the back and forth direction, to attenuation force B which is necessary for attenuation of vibration in the lateral direction, can be expressed as a ratio of the total attenuation coefficient C1t in the back and forth direction to the total attenuation coefficient C2t in the lateral direction, as in following Equation 10.

$$C1t:C2t=A:B \quad \text{[Equation 10]}$$

Hence, from Equations 8 to 10, Equation 11 follows.

$$4C \sin^2\theta \times A = 4C \cos^2\theta \times B \quad \text{[Equation 11]}$$

Accordingly, Equation 12 is obtained.

$$(1-\cos^2\theta) \times A = \cos^2\theta \times B \quad \text{[Equation 12]}$$

Thus, the inclination angle θ of the respective oil dampers 24 can be expressed by way of the attenuation force A necessary for attenuation of vibration of the cab 13 in the back and forth direction and the attenuation force B necessary for attenuation of vibration in the lateral direction, as in Equation 13.

$$\theta = \cos^{-1}\sqrt{A/(A+B)} \quad \text{[Equation 13]}$$

In this manner, the inclination angle θ of the oil dampers 24 is determined according to the attenuation force A which is necessary for attenuation of vibrations of the cab 13 in a back and forth direction and the attenuation force B which is necessary for attenuation of vibrations in a lateral direction.

Accordingly, adjustments are made to the inclination angle θ for each one of the oil dampers 24 which are each set in a horizontal position. With this oil damper arrangement, it becomes possible to attenuate vibrations of the cab 13 occurring in back and forth directions as well as vibrations occurring in lateral directions through the respective oil dampers 24. This means that there is no necessity for using two types of oil dampers, for example, one for attenuation of vibrations of the cab 13 in the back and forth direction and the other for attenuation of vibrations in the lateral direction, and it becomes possible to simplify the administration of inventory and to cut costs. Besides, in case the cab 13 is put in vibration in the rotational direction (hereinafter referred to as "yawing" for brevity), such yawing movements can also be attenuated by the oil dampers 24.

The hydraulic excavator, with the above-described arrangements according to the present embodiment, can effectively damp vibrations of the cab 13 which is mounted on the hydraulic excavator, in the manner as described below.

Figure 7:
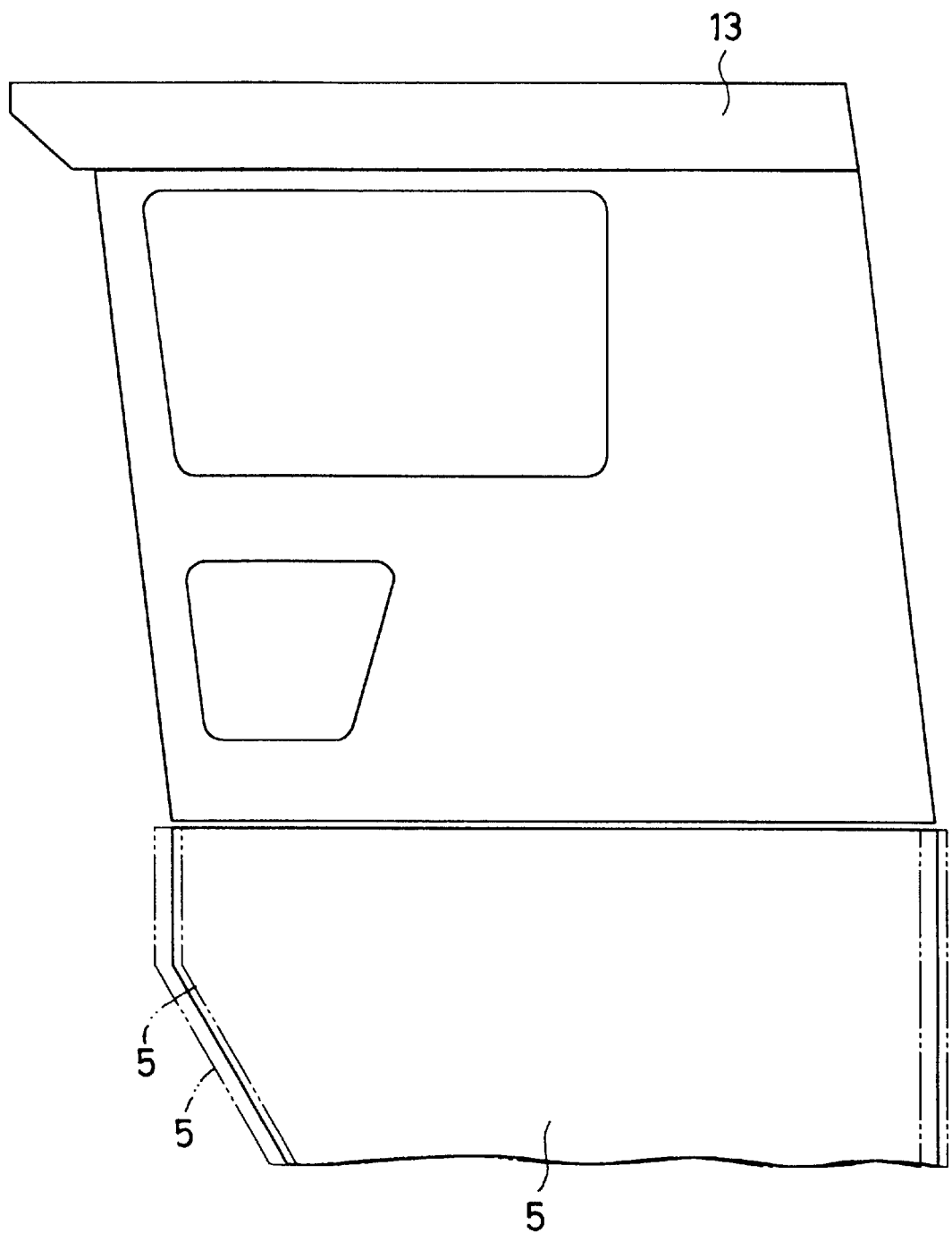
FIG. 7 is a schematic illustration explanatory of conditions of the cab when the bed frame is vibrated in a back and forth direction.

Firstly, for example, if the main frame 4 is largely vibrated back and forth while the truck body 1 is in travel or during a ground excavating operation by the working mechanism 3, upper portions of the bed frame 5 are also vibrated largely in the back and force direction, and the vibration of the bed frame 5 is transmitted to the respective anti-vibrational mounts 18, thereby causing lower portions of the laminated rubber bodies 23 to vibrate likewise in the back and forth direction. However, since the laminated rubber bodies 23 of the anti-vibrational mounts 18 have relatively low rigidity against vibrations of horizontal directions, they are caused to flex in the back and forth direction between the bed frame 5 and the floor panel 14 of the cab 13. Therefore, even if the bed frame 5 is vibrated largely in the back and forth direction as shown in FIG. 7, the oil dampers 24 act to prevent direct transmission of the vibration to the cab 13 and to suppress vibrations of the cab 13.

In addition, even if back and forth vibrations are transmitted to the cab 13, the laminated rubber bodies of the anti-vibrational mounts 18 which have high rigidity against vibrations in vertical directions function to translate the vibrations into horizontal parallel movements. Therefore, the cab 13 is prevented from being largely shaken by pitching to ensure improved amenity within the cab 13 as well as improved maneuverability of control levers.

Further, even in case the main frame 4 is vibrated to the right and left or in lateral directions, thereby causing upper portions of the bed frame 5 to likewise vibrate largely in lateral directions, the laminated rubber bodies 23 of the anti-vibrational mounts 18 are flexed between the bed frame 4 and the floor panel 14 of the cab 13, thereby to prevent direct transmission of vibration from the bed frame 5 to the cab 13 and to suppress vibrational movements of the cab 13.

Therefore, even if vibrations of lateral directions were transmitted to the cab 13, the laminated rubber bodies 23 of the anti-vibrational mounts 18 which have relatively high rigidity in the vertical direction function to translate the vibrations into horizontal parallel movements of the cab 13. Therefore, the cab 13 is prevented from being shaken largely by rolling vibrations to ensure improved amenity within the cab 13.

Further, the laminated rubber bodies 23 of the anti-vibrational mounts 18 which have high rigidity in the vertical direction function to prevent inclinations of the cab 13 on the bed frame 5 even when the vehicle body is inclined on a slope, for example, always maintaining the cab 13 in a horizontal state relative to the bed frame 5.

On the other hand, in case the laminated rubber bodies 23 of the anti-vibrational mounts 18 are flexed due to vibration of the bed frame 5 to put the cab 13 in horizontal parallel movements, the restoring forces of the laminated bodies 23 may give rise to residual vibrations of the cab 13 in horizontal directions. However, by the oil dampers 24 which are mounted horizontally between the bed frame 5 and the floor panel 14 of the cab 13, such residual vibrations can be attenuated to a sufficient degree for preventing the phenomenon of resonance which might otherwise be caused is by residual vibrations.

In this regard, each one of the oil dampers 24 is mounted in a horizontal plane and in an inclined posture at a certain inclination angle θ from the back and forth directions of the cab 13. Therefore, despite the use of oil dampers 24 of the same type, adjustments can be made of the attenuation force against residual vibrations in the back and forth directions of the cab 13 as well as of the attenuation force against residual vibrations in lateral directions, by suitably varying the inclination angle θ.

It follows that there is no necessity for employing two types of oil dampers, one type for attenuation of vibrations of the cab 13 in back and forth directions and another type for attenuation of vibrations of the cab 13 in lateral directions. Therefore, the above-described arrangements according to the present embodiment contribute to simplify the administration of inventory to a significant degree and to realize cost reductions.

Further, for example, when the cab 13 is put in yawing movements as a result of rotational movements of the upper rotary body 2, such yawing movements can also be attenuated by the respective oil dampers 24.

Thus, according to the present embodiment, the anti-vibrational mounts 18 which support the cab 13 on the bed frame 5 are each constituted by the laminated rubber body 23 which is arranged to have high rigidity against vibrations in vertical directions but to have low rigidity against vibrations in lateral directions. These characteristics of the laminated rubber bodies 23 prevent the cab 13 from being shaken to a considerable degree by pitching and rolling vibrations, and contribute to improve the amenity of the operator's cab 13 as well as the maneuverability of control levers or other instruments in the cab 13.

In addition, for attenuating vibrations of the cab 13, the oil dampers 24 are provided in the four corner portions between the bed frame 5 and the floor panel 14 of the cab 13. Therefore, even if residual vibrations occur to the cab 13 under the influence of restoring forces of the laminated rubber bodies 23 which constitute the anti-vibrational mounts 18, such residual vibrations can also be attenuated by the oil dampers 24. The oil dampers 24 thus prevent the phenomenon of resonance which might otherwise occur to the cab 13 under the influence of residual vibrations, thereby improving the amenity of the cab 13 all the more.

The present embodiment is particularly arranged to facilitate the job of assembling the cab 13 on the bed frame 5 through the anti-vibrational mounts 18, as described below with reference to FIG. 5.

In the first place, the lower mounting plates 19 of the anti-vibrational mounts 18 are fastened by bolts 20 to the mounting seats 12 which are securely fixed on the upper side of the cab support plate 9. Then, the cab 13 is lifted up by the use of a crane or the like (not shown) to a position where the mounting seats 15 on the lower side of the floor panel 14 of the cab 13 face the corresponding upper mounting plates 21 of the anti-vibrational mounts 18.

Next, the cab 13 is lowered until the mounting seats 15 on the side of the cab 13 come into abutting engagement with the upper mounting plates 21 of the anti-vibrational mounts 18. At this time, the stud bolt 17 which is projected downward from each mounting seat 15 can be easily threaded into the bolt hole 21A of the opposing upper mounting plate 21 when the cab 13 is lowered toward the anti-vibrational mounts 18.

Then, the nuts 22 are threaded onto the stud bolts 17 which are projected downward on the lower side of the upper mounting plates 21 through the bolt holes 21A, thereby fastening the upper mounting plates 21 of the respective anti-vibrational mounts 18 to the floor panel 14 of the cab 13. As a result, the cab 13 is mounted on the cab support plate 9 of the bed frame 5 through the anti-vibrational mounts 18.

In this instance, as the cab 13 is lowered onto the anti-vibrational mounts 18 on the part of the bed frame 5, the cab 13 is automatically brought into a correct position relative to the anti-vibrational mounts 18 upon passing the stud bolts 17 on the lower side of the floor panel 14 of the cab 13 through the bolt holes 21A in the upper mounting plates 21 of the anti-vibrational mounts 18.

Therefore, the cab 13 can be assembled and mounted in position quite easily and efficiently, freeing the workers from a danger of getting a finger or fingers pinched between the cab and an anti-vibrational mount, as often experienced, for example, in the case of the prior art in which requires the insertion of fastening bolts into bolt holes while holding bolt holes on the side of a cab, which is lifted up by a crane, in matching positions relative to bolt holes on the side of the anti-vibrational mounts.

Figure 8:
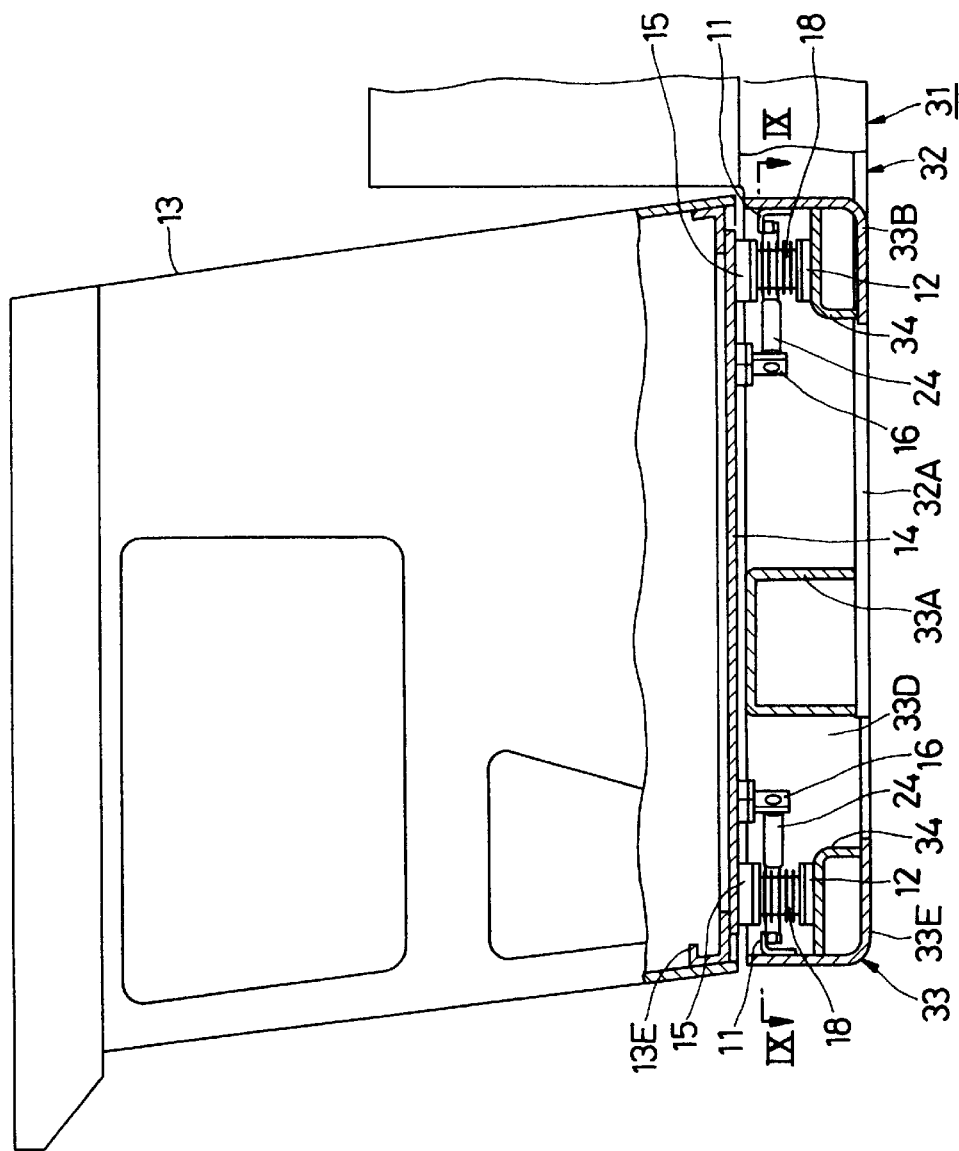
FIG. 8 is a partly cutaway side view of a main frame, cab and anti-vibrational mounts employed in a second embodiment according to the present invention.
Figure 9:
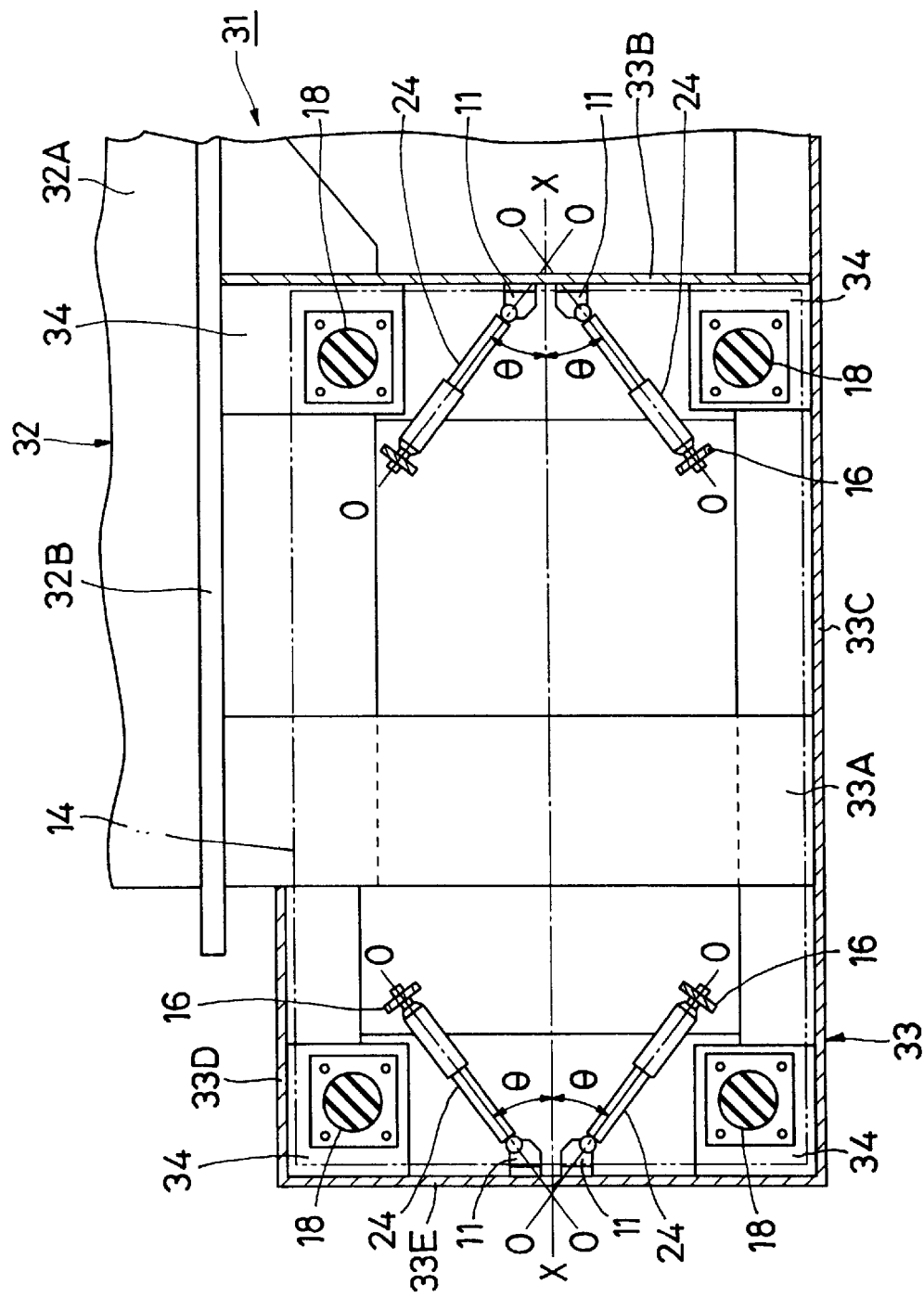
FIG. 9 is a transverse sectional view taken from the direction of arrows IX-IX of FIG. 8 and showing the anti-vibrational mounts and oil dampers of FIG. 8.

Turning now to FIGS. 8 and 9, there is shown a second embodiment of the present invention, which is characterized in that, directly through the anti-vibrational mounts, the cab is supported on a main frame which constitutes a bottom portion of a rotary body to provide an ordinary type hydraulic excavator instead of a high mount type. In the following description of the second embodiment, those component parts which are common with the foregoing first embodiment are simply designated by common reference numerals or characters to avoid repetitions of the same explanations.

In the figures, indicated at 31 is a main frame which is employed in a hydraulic excavator of the present embodiment. The main frame 31 includes a center frame 32 which is mounted on a rotational mechanism (not shown), and, in place of the bed frame 5 of the foregoing first embodiment, a cab support structure 33 is provided on a left front portion of center frame 32.

In this instance, the center frame 32 is constituted by thick steel plates, including a bottom plate 32A and a pair of vertical or upright 32B (only one vertical plate is shown in the drawing) plates which are extended on and along the bottom plate 32A in the back and forth direction of the machine. The cab support structure 33 is largely constituted by a cross beam 33A of U-shape in section which is extended transversely across a front portion of the center frame 32, a rear frame 33B of L-shape in section which is extended in the transverse direction on the rear side of the center frame 32, a side frame 33C which is extended in the back and forth directions and securely connected to left ends of the cross beam 33A and rear frame 33B, a longitudinal beam 33D which is extended in the longitudinal direction from a right end of the cross beam 33A in parallel relation with the side frame 33C, and a front frame 33E of L-shape in section which is extended in the transverse direction and arranged to connect front ends of the side frame 33C and longitudinal beam 33D with each other.

Four seat members 34 each of L-shape in section are securely fixed to the rear frame 33B and front frame 33E of the cab support structure 33. An anti-vibrational mount 18 is mounted between each seat member 34 and the floor panel 14 of the cab 13 to support the cab 13 resiliently on the main frame 31.

Further, on the side of the frame, four brackets 11 in total are securely fixed to the rear and front frames 33B and 33E of the cab support structure 33, for example, by welding in symmetrical positions in the back and forth and transverse directions. In this case, oil dampers 24 are mounted in positions between these brackets 11 on the side of the frame and four brackets 16 which are securely fixed to the lower side of the floor panel 14 of the cab 13, so that the main frame 31 and the floor panel 14 of the cab 13 are connected with each other through the oil dampers 24.

The oil dampers 24 of this embodiment are similarly arranged in angular positions. Namely, the oil dampers 24 in a left front portion and in a right front portion of the cab 13 are arranged in such angular positions that their longitudinal axes O—O are intersected with each other on the front side of the cab 13 with an inclination angle θ from the back and forth direction X—X. On the other hand, the oil dampers 24 in a left rear portion and in a rear right portion of the cab 13 are arranged in such angular positions that their longitudinal axis O—O are intersected with each other on the rear side of the cab 13 with an inclination angle θ from the back and forth direction X—X.

In the case of the hydraulic excavator of the present embodiment, employing the above-described arrangements, when the main frame 31 is put in vibration in the back and forth directions or in a lateral direction (or in a horizontal direction), the laminated rubber bodies 23 of the anti-vibrational mounts 18 are caused to flex between the main frame 31 and the floor panel 14 of the cab 13 to prevent direct transmission of the vibration from the main frame 31 to the cab 13, thereby suppressing vibrations of the cab 13.

Besides, since the laminated rubber bodies 23 of the anti-vibrational mounts 18 are arranged to have high rigidity against vibrations in the vertical direction, the cab 13 is put in horizontal parallel movements. Therefore, the anti-vibrational mounts prevent the cab 13 from being largely shaken by pitching or rolling vibrations, thereby improving the amenity of the cab 13 as well as the maneuverability of control levers within the cab 13.

In addition, when the cab 13 is put in horizontal parallel movements as a result of vibration of the main frame 31, the residual horizontal vibrations which may occur on the cab 13 due to restoring forces of the laminated rubber bodies 23, can be attenuated by the oil dampers 24 which are interposed between the main frame 31 and the floor panel 14 of the cab 13 to preclude the phenomenon of resonance which might occur as a result of the residual vibrations.

Figure 10:
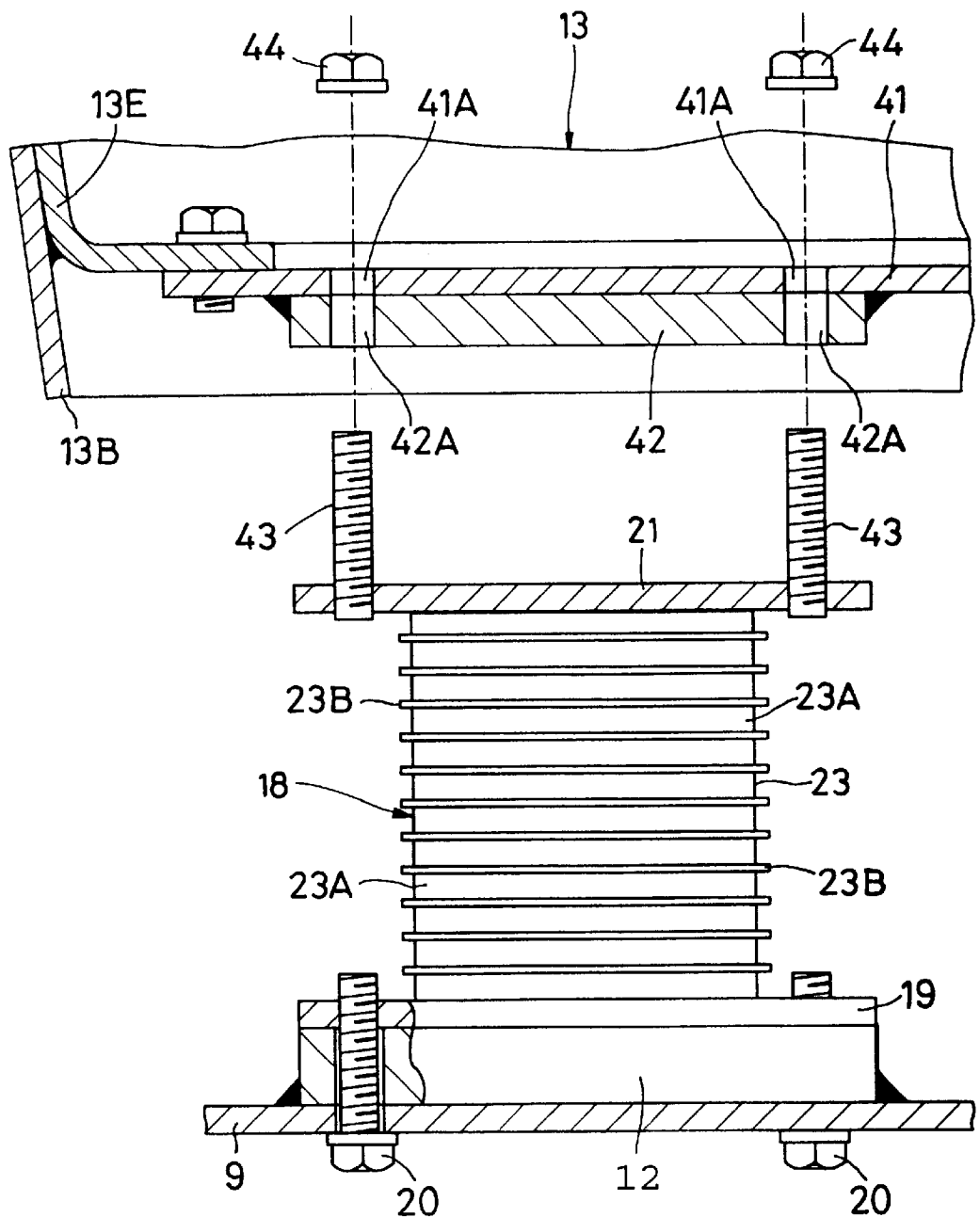
FIG. 10 is a sectional view on an enlarged scale of anti-vibrational mounts and stud bolts employed in a third embodiment, showing the mount members and stud bolt in an unassembled state.

Now, referring to FIG. 10, there is shown a third embodiment of the present invention, which is characterized in that the stud bolts which fasten the anti-vibrational mounts to the cab are provided on the part of the upper mounting plates of the anti-vibrational mounts. In the following description of the third embodiment, those component parts which are common with the foregoing first embodiment are simply designated by common reference numerals or characters to avoid repetitions of same explanations.

In that figure, indicated at 41 is a floor panel of the cab 13, which is bored with a plural number of bolt holes 41A (only two of which are shown in the drawing) to receive stud bolts which are provided on the part of the anti-vibrational mounts 18 as will be described hereinbelow.

Denoted at 42 are mounting seat plate which are securely fixed to the lower side of the floor panel 41. Each mounting seat plate 42 is bored with four bolt holes 42A in axially aligned relation with the bolt holes 41A in the floor panel 41.

Indicated at 43 are two of four stud bolts which are, securely fixed to the upper mounting plates 21 of the anti-vibrational mounts 18. Each one of these stud bolts 43 is planted in an upright position and adapted to be passed through the bolt hole 42A in the mounting seat plate 42 and the bolt hole 41A in the floor panel 41.

In the case of the present embodiment with the arrangements just described, the cab 13 is mounted on the cab support plate 9 through the anti-vibrational mounts 18 in the manner as follows. In the first place, the lower mounting plates 19 of the anti-vibrational mounts 18 are fastened to the mounting seat 12 of the cab support plate 9 by the use of bolts 20, and then the cab 13 is lifted up by the use of a crane or the like (not shown) to bring the mounting seat plates 42 on the lower side of the floor panel 41 into face to face relation with the upper mounting plates 21 of the anti-vibrational mounts 18.

In the next place, the cab 13 is lowered to receive the stud bolts 43 on the anti-vibrational mounts 18 in the bolt holes 42A and 41A in the mounting seat plates 42 and the floor panel 41, respectively, and the cab 13 is fixed on the cab support plate 9 through the anti-vibrational mounts 18 by threading and tightening the nuts 44 onto the upper ends of the stud bolts 43 which are projected on the upper side of the floor panel 41 through the bolt holes 41A.

Thus, according to the present embodiment, as the cab 13 is lowered onto the anti-vibrational mounts 18, it can be automatically set in a predetermined position relative to the anti-vibrational mounts 18 in a safe and facilitated manner upon inserting the stud bolts 43 into the bolt holes 41A and 42A in the floor panel 41 and the mounting seat plates 42.

Figure 11:
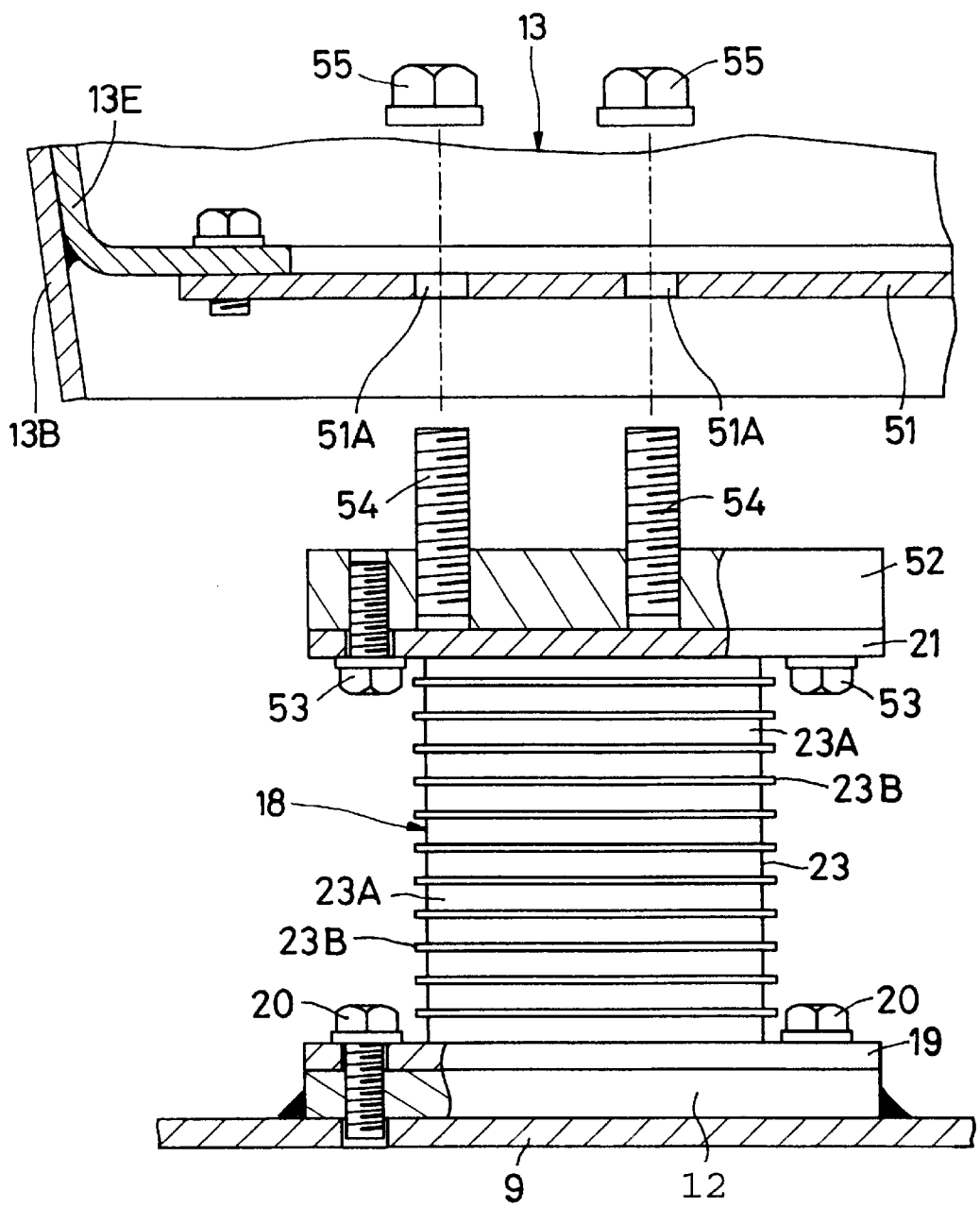
FIG. 11 is a sectional view on an enlarged scale of a cab, anti-vibrational mounts, an intermediate connecting plate and stud bolts employed in a fourth embodiment of the present invention and shown in an unassembled state.
Figure 12:
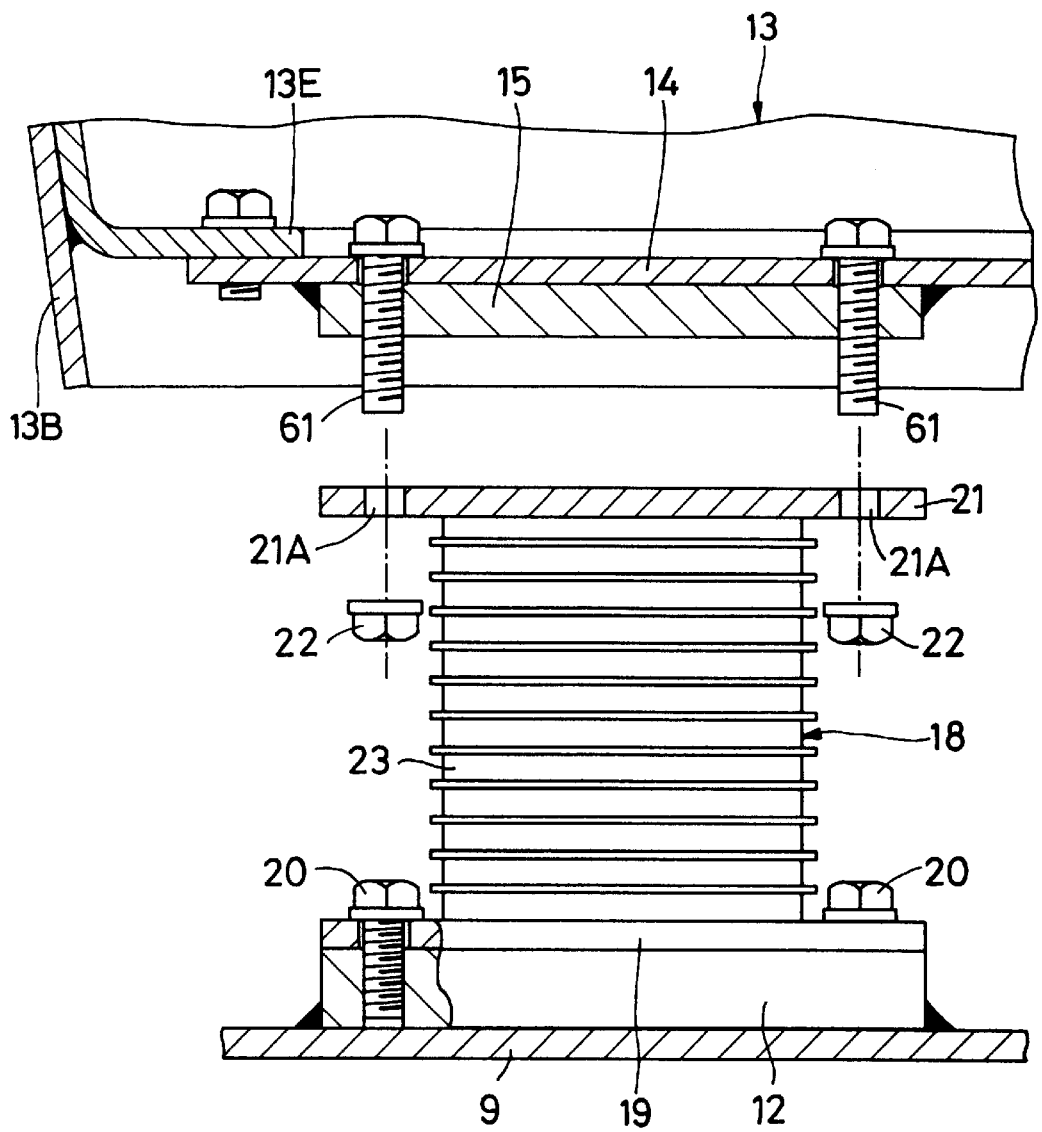
FIG. 12 is a sectional view on an enlarged scale of a cab, anti-vibrational mounts and stud bolts employed in a modification of the first embodiment and shown in an unassembled state.
Figure 13:
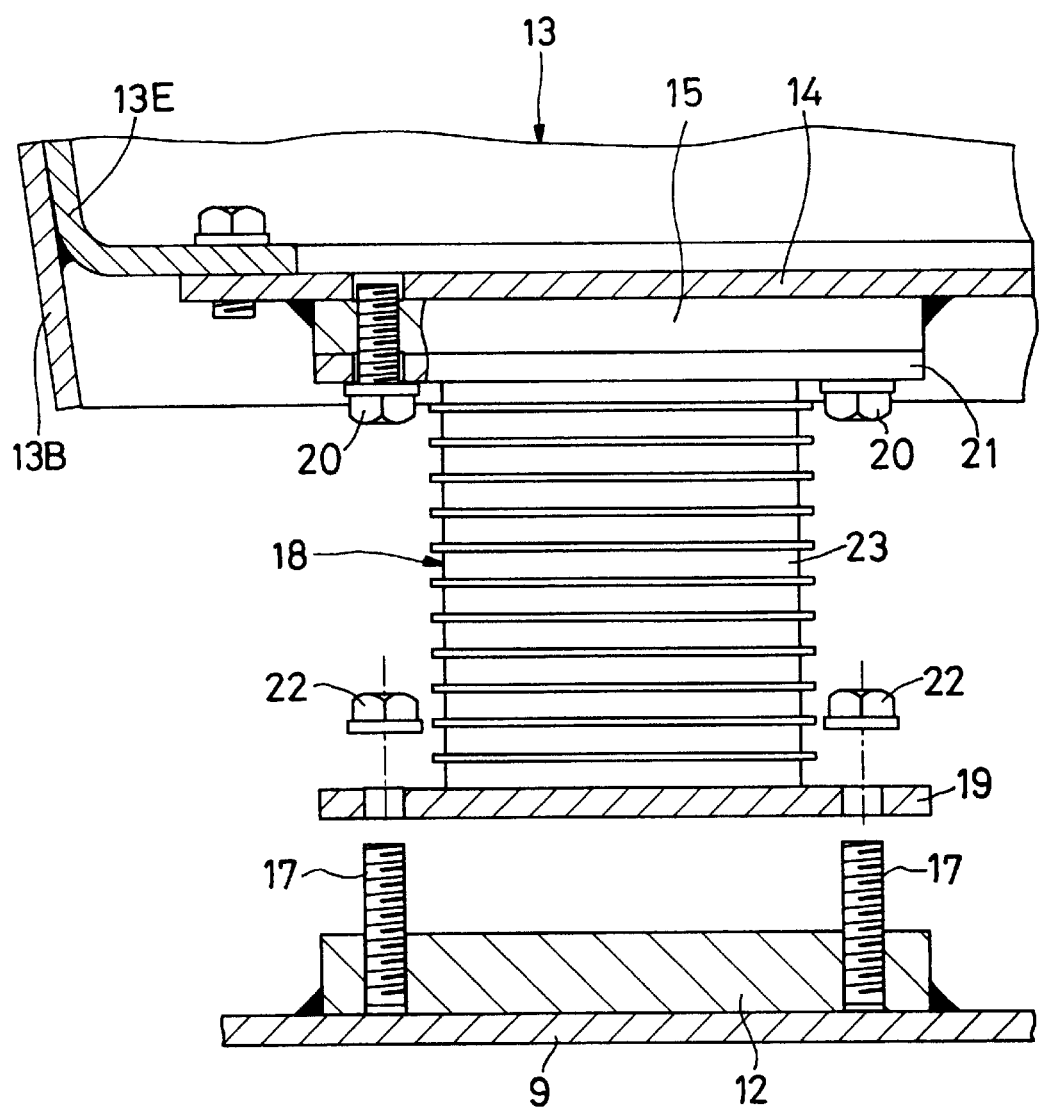
FIG. 13 is a sectional view of on an enlarged scale of a cab, anti-vibrational mounts and stud bolts employed in another modification of the first embodiment.
Figure 14:
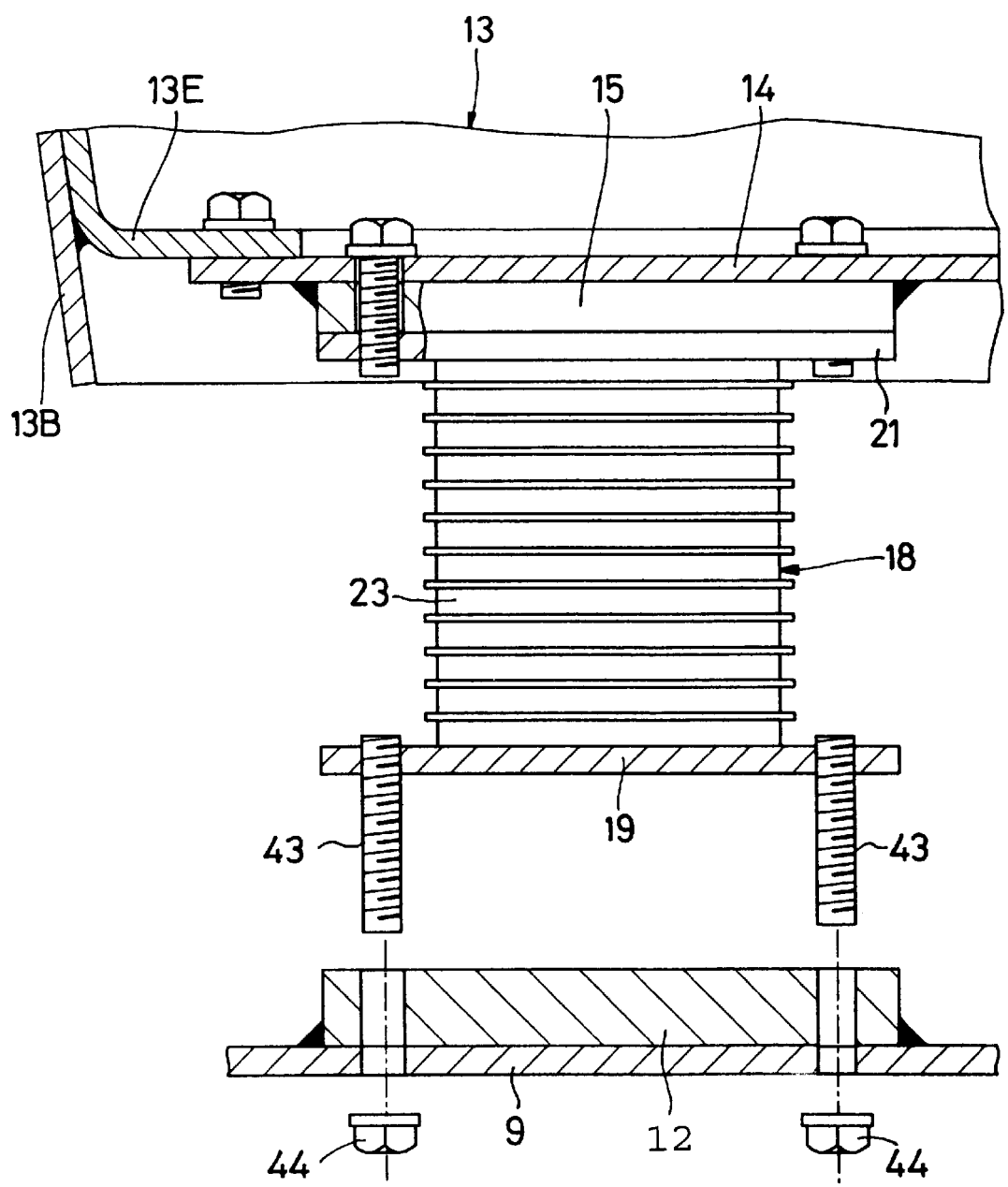
FIG. 14 is an enlarged sectional view of a cab, anti-vibrational mounts and stud bolts employed in a modification of the third embodiment and shown in an unassembled state.
Figure 15:
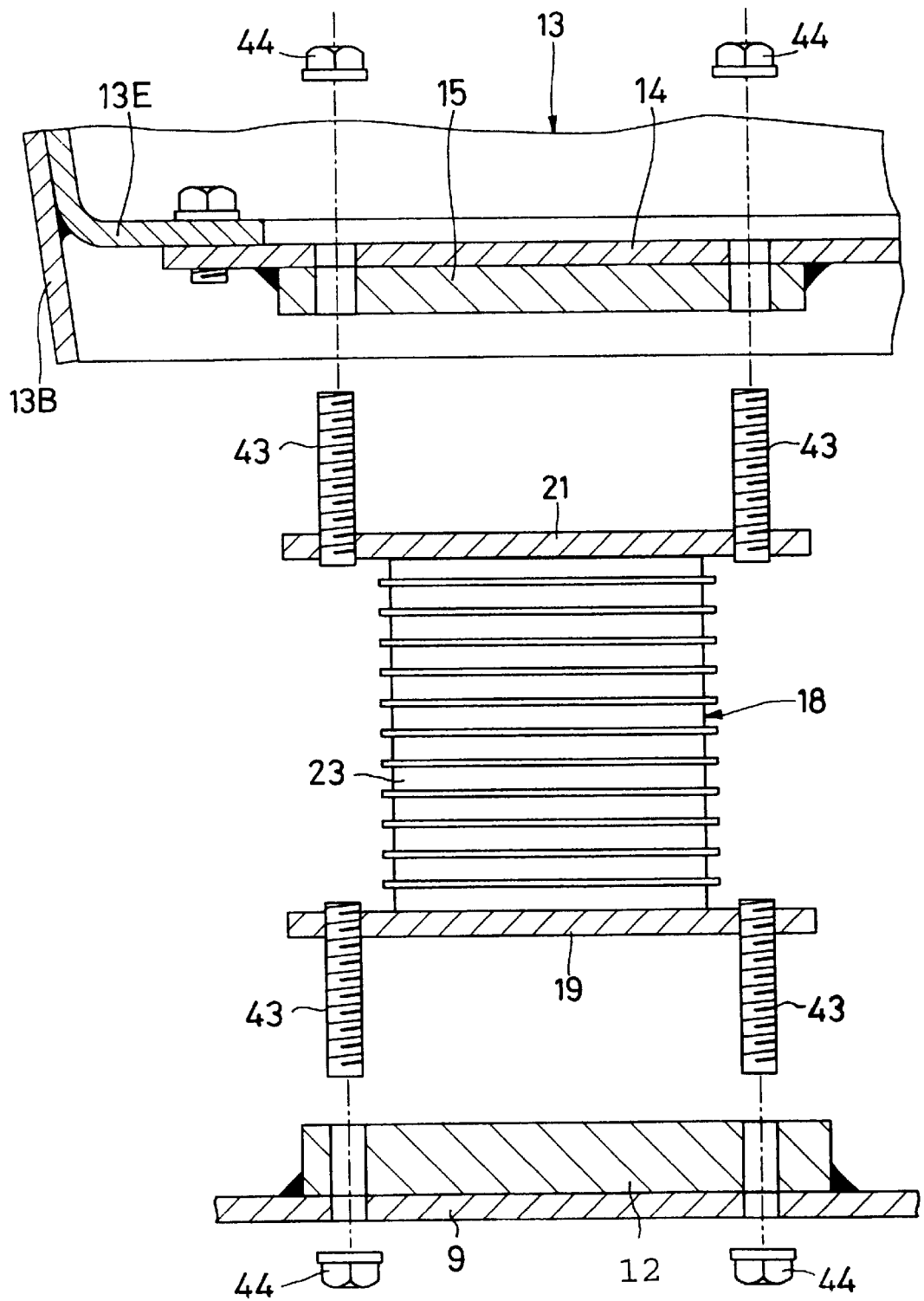
FIG. 15 is a sectional view on an enlarged scale of a cab, anti-vibrational mounts and stud bolts employed in another modification of the third embodiment and shown in an unassembled state.
Figure 16:
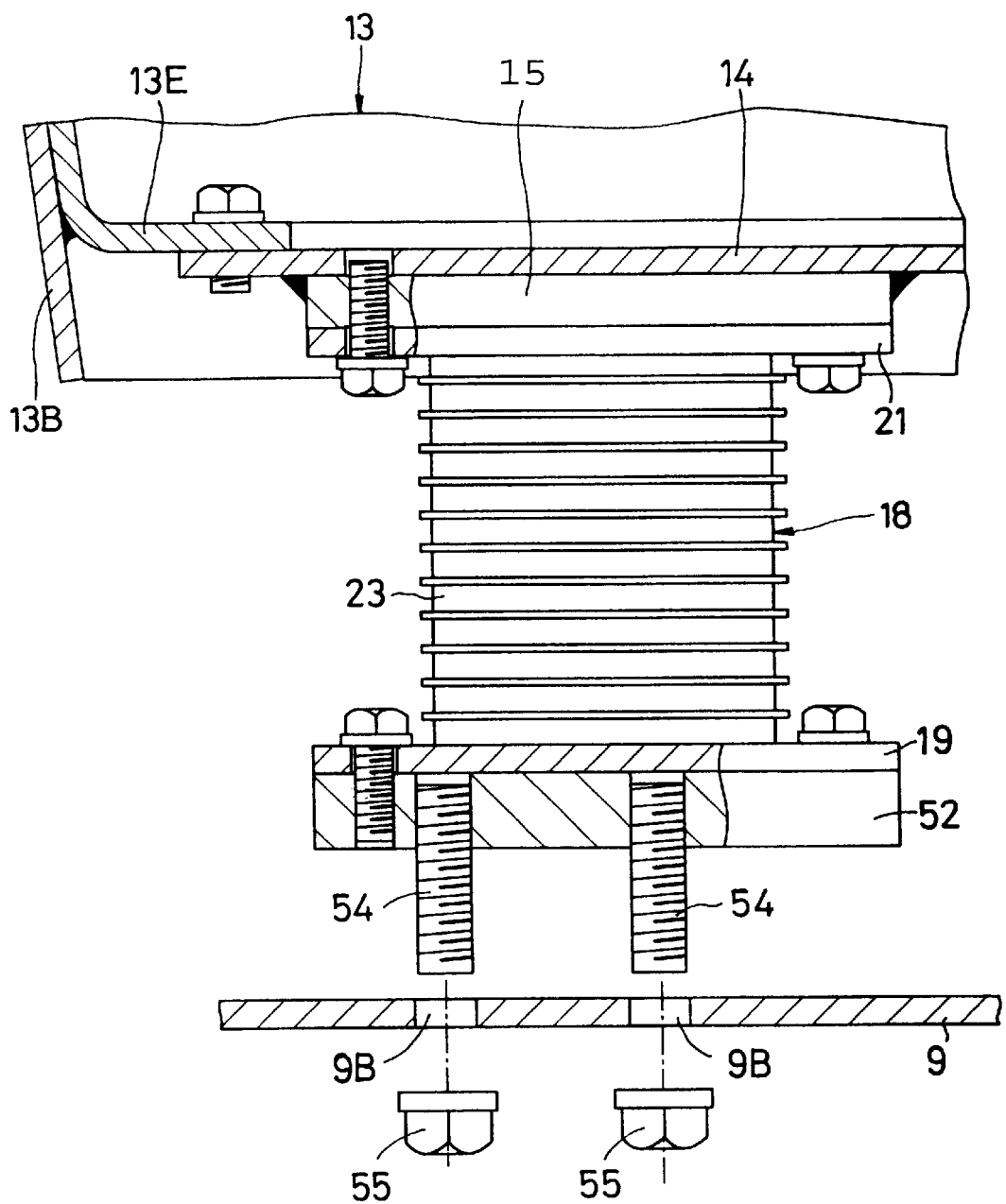
FIG. 16 is a sectional view on an enlarged scale of a cab, anti-vibrational mounts and stud bolts employed in a modification of the fourth embodiment and shown in an unassembled state.
Figure 17:
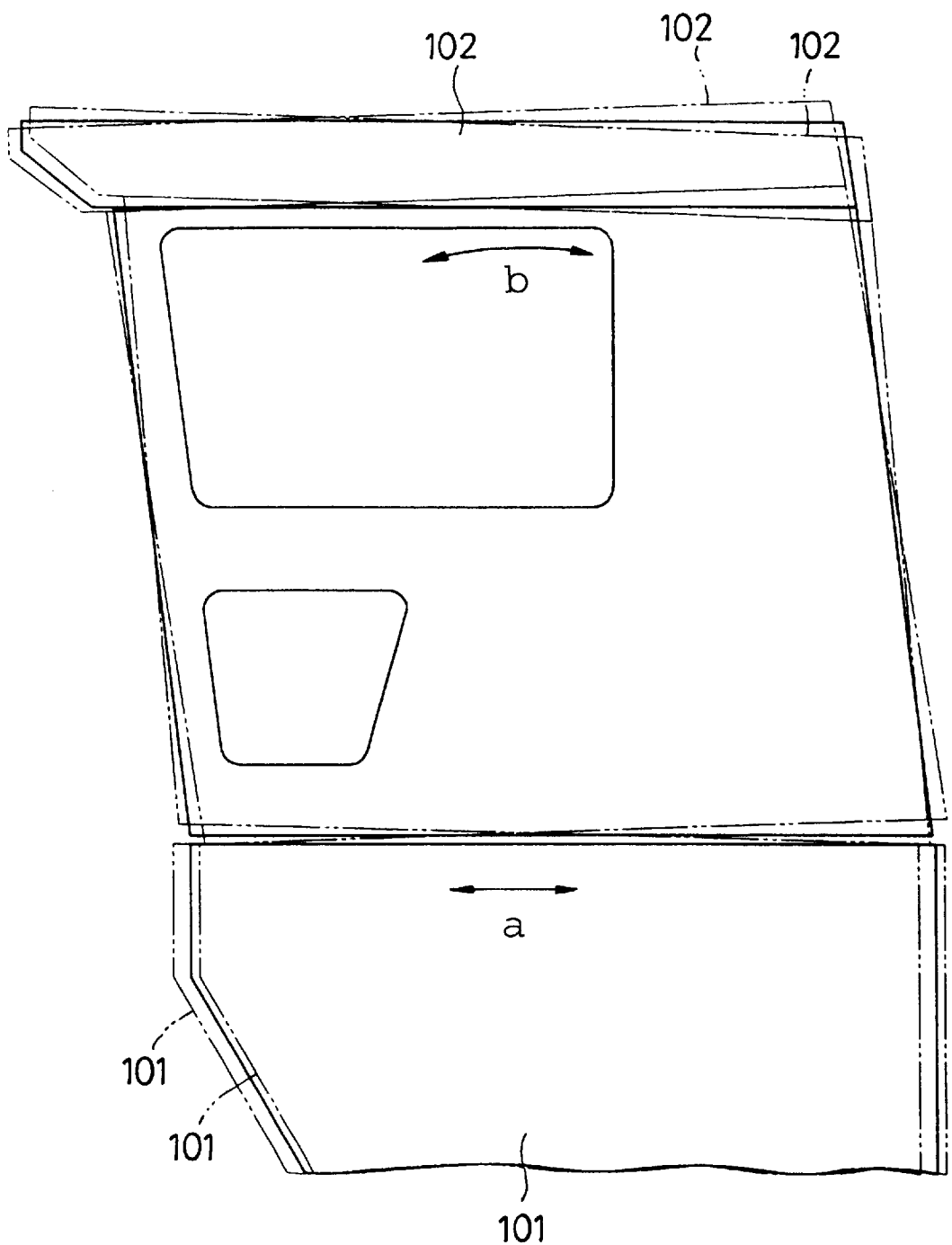
FIG. 17 is a schematic illustration explanatory of conditions of a prior art cab in pitching movement.

Referring now to FIG. 11, there is shown a fourth embodiment of the present invention, which is characterized in that an intermediate connecting plate with stud bolts is attached to the upper mounting plate of the anti-vibrational mount. In the following description of the fourth embodiment, those component parts which are common with the foregoing first embodiment are designated by common reference numerals or characters to avoid repetitions of same explanations.

Indicated at 51 in that figure is a floor panel of the cab 13. Opened in the floor panel 51 are a number of bolt holes 51A (only two of which are shown in the drawing) for receiving stud bolts 54, which will be described hereinafter.

Designated at 52 is an intermediate connecting plate which is fixed to the top side of the upper mounting plate 21 of the anti-vibrational mount 18 by means of four bolts 53 (only two of which are shown in the drawing). Four upright stud bolts 54 (only two of which are shown in the drawing) are planted in the intermediate connecting plate 52. These stud bolts 54 are projected upward through the bolt holes 51A in the floor panel 51 of the cab.

According to the present embodiment with the arrangements Just described, at the time of mounting the cab 13 on the cab support plate 9 through the anti-vibrational mounts 18 which are each provided with the intermediate connecting plate 52, in the first place the intermediate connecting plate 52 is attached to the upper mounting plate 21 of each anti-vibrational mount 18 by means of the bolts 53, and the lower mounting plate 19 of each anti-vibrational mount 18 is fastened to the mounting seat 12 of the cab support plate 9 by means of the bolts 20.

In the next place, the cab 13 is lowered by the use of a crane or the like (not shown) to receive the stud bolts 54 of the respective intermediate connecting plates 52 in the bolt holes 51A in the floor panel 51 of the cab 13, and the nuts 55 are threaded and tightened onto the upper ends of the stud bolts 54 which are respectively projected on the upper side of the floor panel 51 through the bolt holes 51A. As a result, the cab 13 is mounted on the cab support plate 9 through the anti-vibrational mounts 18.

Thus, according to the present embodiment, as the cab 13 is lowered onto the anti-vibrational mounts 18, it can also be automatically brought into a predetermined position relative to the anti-vibrational mounts 18 in a safe and facilitated manner upon inserting the stud bolts 54 of the intermediate connecting plates 52 into the bolt holes 51A in the floor panel 51 of the cab 13.

Further, according to the present embodiment, for example, when one of the anti-vibrational mounts 18 is damaged and should be removed for replacement, it can be extracted easily in a horizontal direction after removing the bolts 20 and 53 from the lower and upper mounting plates 19 and 21 of the anti-vibrational mount 18. Therefore, a damaged anti-vibrational mount can be replaced quite easily, without entailing any troublesome job, for example, a job of lifting up the cab 13 for extracting the stud bolts 54 out of the bolt holes 51A of the floor panel 51.

In the above-described first embodiment, the stud bolts 17 are shown as being provided on the mounting seats 15 which are securely fixed on the lower side of the floor panel 14 of the cab 13. However, it is to be understood that the present invention is not restricted to this particular arrangement. For instance, as in a modification shown in FIG. 12, arrangements may be made to insert bolts 61 downward from the upper side of the floor panel 14 and through the mounting seat 15 and to use as stud bolts the lower end portions of the bolts 61 which are projected downward on the lower side of the mounting seat 15.

Further, in the above-described first embodiment, the stud bolts 17 are shown by way of example as being provided on the mounting seat 15 which is securely fixed to the lower side of the floor panel 14. However, the present invention is not restricted to this particular arrangement. For instance, in the manner as in another modification shown in FIG. 13, the stud bolts 17 may be fixedly planted in the mounting seat 12 which is fixed on the upper side of the cab support plate 9. Alternatively, the stud bolts 17 may be provided on each one of the mounting seats 12 and 15 if desired.

Further, in the above-described third embodiment, the stud bolts 43 are shown by way of example as being fixedly planted in the upper mounting plate 21 of the anti-vibrational mount 18. However, the present invention is not restricted to this particular arrangement. For instance, as in a modification shown in FIG. 14, the stud bolts 43 may be fixed in the lower mounting plate 19 of the anti-vibrational mount 18 if desired. Alternatively, as in another modification shown in FIG. 15, the stud bolts 43 may be fixed in the upper and lower mounting plates 18 and 19 of the anti-vibrational mount 18 if desired.

Moreover, in the above-described fourth embodiment, the intermediate connecting plate 52 is shown by way of example as being attached to the upper mounting plate 21 of the anti-vibrational mount 18. However, the present invention is not restricted to this particular arrangement. For instance, as in a modification shown in FIG. 16, there may be employed an arrangement in which the intermediate connecting plate 52 is attached to the lower mounting plate 19 of the anti-vibrational mount 18, with the stud bolts 54 of the intermediate connecting plate 52 passed through the bolt holes 9B which are provided in the cab support plate 9.

Furthermore, in the foregoing embodiments, by way of example, the present invention has been described in connection with a particular type of construction machine. However, the present invention is not restricted to the particular type shown, and can be similarly applied to other construction machines such as wheel loaders, hydraulic cranes and the like.

INDUSTRIAL APPLICABILITY

As clear from the foregoing particular description, according to the present invention, each one of anti-vibrational mounts which are provided between a frame and cab, is constituted by a laminated rubber body which is arranged to have high rigidity against vibrations in vertical directions and low rigidity against vibrations in horizontal directions. Therefore, when the frame is put in vibration in a horizontal direction, the laminated rubber bodies of the anti-vibrational mounts are caused to flex in a horizontal direction between the frame and cab, thereby preventing direct transmission of the vibration from the frame to the cab and suppressing vibration of the cab.

Besides, even if the vibration of the frame is transmitted to the cab, the cab is simply put in horizontal parallel movements and prevented from being shaken largely by pitching or rolling because the laminated rubber bodies have high rigidity against vibrations in vertical directions as mentioned hereinbefore, contributing to improve the amenity in the cab as well as the maneuverability of control levers in the cab.

Further, according to the present invention, four vibration attenuating devices are provided in four corner portions between the frame and the cab and in cooperative positions relative to the anti-vibrational mounts. Therefore, when the cab is put in horizontal parallel movements as a result of vibration of the frame, the vibration attenuating devices act to effectively attenuate residual vibrations which might occur to the cab due to restoring forces of the laminated rubber bodies of the anti-vibrational mounts, thus contributing to improve the amenity within the cab all the more.

In this instance, according to the present invention, two of the four vibration attenuating devices, which are located in front portions of the cab, are mounted in a horizontal plane in an angular posture such that respective longitudinal axes are intersected with each other on the front side of the cab, while the remaining two vibration attenuating devices are mounted in a horizontal plane and in an angular posture such that respective longitudinal axes are intersected with each other on the rear side of the cab. Therefore, the vibration attenuating devices can produce attenuating forces effectively against vibrations in back and forth directions of the cab and also against vibrations in lateral directions.

In the case of the above-described arrangements according to the present invention, there is no need for using two types of oil dampers, one for attenuating vibrations in back and forth directions of the cab and the other for attenuating vibrations in lateral directions, which contributes to simplify the administration of the inventory and to cut costs to a significant degree. Furthermore, even if yawing occurs to the cab as a result of a rotating operation, such yawing movements can also be attenuated effectively by the vibration attenuating devices.

What is claimed is:

1. A construction machine having a support frame, an operator's cab mounted on said frame and internally defining an operating room, and four anti-vibrational mounts located in four corner portions between said frame and cab to support the cab on the frame in a vibration damped state, wherein:

each of said anti-vibrational mounts comprises a laminated rubber body having relatively high rigidity against vibration in a vertical direction and relatively low rigidity against vibration in a horizontal direction; and wherein said construction machine further comprises four vibration attenuating devices located in said four corner said construction machine further comprises four vibration attenuating devices located in said four corner portions between said frame and cab and in cooperative positions relative to said anti-vibrational mounts to attenuate horizontal vibrations transmitted to said cab.

2. A construction machine as defined in claim 1, wherein said frame is a main frame constituting a bottom portion of a rotary body of said machine, and said cab is supported on said main frame through said anti-vibrational mounts.

3. A construction machine as defined in claim 1, wherein said frame is composed of a main frame constituting a bottom portion of a rotary body of said machine and a bed frame mounted vertically on said main frame, and said cab is supported on said bed frame through said anti-vibrational mounts.

4. A construction machine as defined in claim 1, wherein each said laminated rubber body has a number of rubber layers laminated alternatively and in parallel relation with a number of thin steel sheet layers, and wherein an upper mounting plate is securely fixed to an upper end of each said laminated rubber body, and a lower mounting plate securely fixed to a lower end of each said laminated rubber body.

5. A construction machine as defined in claim 4, wherein said frame and said lower mounting plate of each said anti-vibrational mount are securely fastened to each other by bolts, and stud bolts are fixedly provided either on a side of said cab or on a side of said upper mounting plate of said anti-vibrational mounts and adapted to be received in bolt holes provided either on the side of said upper mounting plate or on the side of said cab.

6. A construction machine as defined in claim 4, wherein said cab and said upper mounting plate of each said anti-vibrational mount are securely fastened to each other by bolts, and stud bolts are fixedly provided either on a side of said frame or on a side of said lower mounting plate of said anti-vibrational mounts and adapted to be received in bolt holes provided either on the side of said lower mounting plate or on the side of said frame.

7. A construction machine as defined in claim 4, wherein stud bolts are fixedly provided in said lower mounting plate of each said anti-vibrational mount and adapted to be received in bolt holes provided in said frame, and stud bolts are fixedly provided in said upper mounting plate of each said anti-vibrational mount and adapted to be received in bolt holes provided on said cab.

8. A construction machine as defined in claim 4, wherein said frame and said lower mounting plate of each said anti-vibrational mount are securely fastened to each other by bolts, and an intermediate connecting plate is attached to said intermediate connecting plate having stud bolts adapted to be received in bolt holes provided on said cab.

9. A construction machine as defined in claim 4, wherein said cab and said upper mounting plate of each said anti-vibrational mount are securely fastened to each other by bolts, and an intermediate connecting plate is attached to said lower mounting plate of each said anti-vibrational mount, said intermediate connecting plate having stud bolts adapted to be received in bolt holes provided on said frame.

10. A construction machine having a support frame, an operator's cab mounted on said frame and internally defining an operating room, and four anti-vibrational mounts located in four corner portions between said frame and cab to support the cab on the frame in a vibration damped state, wherein:

each of said anti-vibrational mounts comprises a laminated rubber body having relatively high rigidity against vibration in a vertical direction and relatively low rigidity against vibration in a horizontal direction;

said construction machine further comprising four vibration attenuating devices located in said four corner portions between said frame and cab and in cooperative positions relative to said anti-vibrational mounts to attenuate horizontal vibrations transmitted to said cab; and wherein two of said vibration attenuating devices are located in front portions of said cab and are mounted in a horizontal plane and in an angular posture such that respective longitudinal axes of said two of said vibration attenuating devices are intersected with each other on a front side of said cab, and another two of said vibration attenuating devices are located in rear portions of said cab and are mounted in said horizontal plane and in an angular posture such that respective longitudinal axes of said another two of said vibration attenuating devices are intersected with each other on a rear side of said cab.

11. A construction machine having a support frame, an operator's cab mounted on said frame and internally defining an operating room, and four anti-vibrational mounts located in four corner portions between said frame and cab to support the cab on the frame in a vibration damped state, wherein:

each of said anti-vibrational mounts comprises a laminated rubber body having relatively high rigidity against vibration in a vertical direction and relatively low rigidity against vibration in a horizontal direction; and wherein said construction machine further comprises four vibration attenuating devices located in said four corner portions between said frame and cab and in cooperative positions relative to said anti-vibrational mounts to attenuate horizontal vibrations transmitted to said cab, each of said vibration attenuating devices having a longitudinal axis thereof located in a circumscribing position relative to an imaginary ellipse drawn around a bottom center portion of said cab.

* * * * *